United States Patent [19]
Ozveren et al.

[11] Patent Number: 5,617,409
[45] Date of Patent: Apr. 1, 1997

[54] FLOW CONTROL WITH SMOOTH LIMIT SETTING FOR MULTIPLE VIRTUAL CIRCUITS

[75] Inventors: Cuneyt M. Ozveren, Somerville, Mass.; Hallam G. Murray, Jr., Menlo Park, Calif.; Gregory M. Waters, Groton; Robert J. Simcoe, Westborough, both of Mass.

[73] Assignee: Digital Equipment Corporation, Maynard, Mass.

[21] Appl. No.: 189,398

[22] Filed: Jan. 28, 1994

[51] Int. Cl.$^6$ ........................................ H04J 3/14
[52] U.S. Cl. ........................................ 370/235
[58] Field of Search .................... 370/60, 60.1, 94.1, 370/58.1, 58.2, 58.3, 13, 17, 94.2, 110.1

[56] References Cited

U.S. PATENT DOCUMENTS

| | | | |
|---|---|---|---|
| 4,475,192 | 10/1984 | Fernow et al. | 370/94 |
| 4,769,811 | 9/1988 | Eckberg, Jr. et al. | 370/60 |
| 4,839,891 | 7/1989 | Kobayashi et al. | 370/94.1 |
| 4,849,968 | 7/1989 | Turner | 370/94 |
| 5,199,027 | 3/1993 | Barri | 370/60 |
| 5,276,676 | 1/1994 | Horn et al. | 370/60.1 |
| 5,278,825 | 1/1994 | Wallmeier et al. | 370/60 |
| 5,285,446 | 2/1994 | Yonehara | 370/60 |
| 5,289,462 | 2/1994 | Ahmadi et al. | 370/60 |
| 5,313,454 | 5/1994 | Bustini et al. | 370/60 |
| 5,335,224 | 8/1994 | Cole et al. | 370/84 |

OTHER PUBLICATIONS

Oct. 1991, Schroeder, M.D., Birrell, A.D., Burrows, M., Murray, H., Needham, R.M., Rodeheffer, T.L., Satterthwaite, E.H., & Thacker, C., IEEE Journal of Selected Areas in Communications, vol. 9, No. 8, *Autonet: A High–Speed, Self–Configuring Local Area Network Using Point–to–Point Links*.

Jun. 21, 1993, Kung, H.T., Chapman, A., *The FCVC (Flow Controlled Virtual Channels) Proposal for ATM Networks* (Draft).

Primary Examiner—Wellington Chin
Assistant Examiner—Huy D. Vu
Attorney, Agent, or Firm—David A. Dagg

[57] ABSTRACT

A flow control system is disclosed, for a transmitting node and a receiving node. The transmitting node and the receiving node are linked together through multiple connections or virtual circuits. A flow control circuit in the transmitting node limits the number of data transmission units transmitted from the transmitting station, and not yet copied out of the receive buffers in the receiving node, to the total number of receive buffers in the receiving node. The flow control circuit in the transmitting node further controls the transmission of data transmission units on the multiple connections fairly, such that all connections are provided a proportional amount of the total available receive buffers in the receiving node. In an example embodiment, a global counter is used to maintain the total number of receive buffers containing data in the receiving node, and a global limit register contains the maximum number of receive buffers containing data in the receiving node allowed for a single connection. The flow control circuit further includes logic providing fair and efficient allocation of receive buffers across all virtual circuits between a transmitting node and a destination node. The flow control circuit ensures that during steady state operation, receive buffers in the receiving node, which are used to store data transmission units received from the transmitting node, are fairly divided among all active virtual circuits in the transmitting node.

32 Claims, 10 Drawing Sheets

FLOW CONTROL WITH SMOOTH LIMIT SETTING FOR MULTIPLE VIRTUAL CIRCUITS

FIELD OF THE INVENTION

The disclosed invention relates generally to communications networks using virtual circuits, and more particularly to communications networks using flow control to avoid dropping packets when the network is congested.

BACKGROUND

Flow control systems are used in communication networks to prevent packet loss due to lack of buffer resources at the receiving end of a transmission. In multiple virtual circuit architectures such as Asynchronous Transfer Mode (ATM), existing flow control systems require a fixed amount of buffering per virtual circuit. The total amount of buffering required to support flow control systems for multiple virtual circuit architectures therefore increases with the number of virtual circuits allowed per node.

In known virtual circuit based networks, flow control is applied on each link for every virtual circuit, independent of all other virtual circuits. A window based flow control scheme is used, in which a cell is a fixed size message of a given length, and the window size equals a maximum number of cells r that can be transmitted during the round trip propagation delay between the transmitting node and the destination node.

In such known virtual circuit based networks, if v is the maximum number of virtual circuits allowed per destination node, then the total buffer requirement is rv receive buffers per destination node, where each receive buffer is sufficient in size to store one cell. As the distance between the transmitting node and the destination node increases, the total buffer requirement per destination node increases similarly. For this reason, where very long maximum distance links are permitted, buffer requirements in these systems can be impractical.

For example, in a known system where the maximum number of virtual circuits allowed per destination node is $2^{14}$, having a link speed of 622 megabits per second, there is required over 1 gigabyte of receive buffer memory in a destination node across a 100 kilometer link. This amount of receive buffer memory is used to ensure there is no performance limitation due to lack of receive buffers in the destination node. In such a known system, over 10 gigabytes of receive buffer memory is required in a destination node over a 1000 kilometer link.

Further in known flow control systems, there is a general need for fair and efficient allocation of receive buffers across all active logical connections between nodes. If fair allocation is not provided, some logical connections will receive more receive buffer resources than others, and as a consequence, performance in terms of throughput will be uneven across multiple connections. This problem potentially results in unacceptable variations in response time for users of distributed applications. Moreover, where receive buffer allocation is not efficient, the overall maximum performance will not be obtained because of wasted receive buffers. For example, when a receive buffer is allocated to a connection which does not need the receive buffer, that receive buffer could more efficiently be allocated to another connection which has a pending transmission request.

As shown above, total receive buffer requirements of existing flow control systems in communications systems using virtual circuits are prohibitively costly where long distance links between nodes are allowed. It is also desirable that receive buffers be fairly and efficiently allocated across all virtual circuits within a node. For these reasons and others, there is therefore a need for a flow control system requiring fewer total receive buffers than existing systems, and which allocates receive buffers fairly and efficiently.

SUMMARY

In accordance with principles of the invention, there is provided a flow control system for communications networks having long distances between nodes, requiring fewer total receive buffers than existing systems, and fairly allocating receive buffers among multiple virtual circuits with a given destination node.

The herein disclosed flow control system is applicable to any communications network having multiple logical or physical connections between a transmitting node and a receiving node over which data is exchanged. After a connection has been established between the transmitting node and the receiving node, and the transmitting node is actively transmitting on that connection, the connection is said to be active on the transmitting node. An example of a connection between a transmitting node and a receiving node is a Virtual Circuit (VC).

Hereinafter, the term "Data Transmission Unit" (DTU) is used to refer to a unit length of data transmitted from a transmitting network node to a receiving network node. The specific length of a DTU is implementation specific. Each message transmitted between a transmitting network node and a receiving network node has a length equal to some number of DTUs. The term "cell" is used herein to refer to a message having a size equal to one DTU. An example of a system using fixed sized messages known as cells is Asynchronous Transfer Mode (ATM). The example embodiments herein are described in terms of cells. It will be evident to one skilled in the art that the principles of the invention also apply to systems using variable length messages, such as packets or frames, to exchange data between network nodes.

The term receive buffer will hereinafter be used to refer to a unit of data storage in a receiving node sufficient to store one data transmission unit or cell.

The disclosed flow control system includes a common pool of receive buffers in the receiving node for storing DTUs received from the transmitting node over any of the multiple connections between the transmitting node and the receiving node. The receiving node further includes a connection specific pool of receive buffers associated with each one of the potential multiple connections between the transmitting node and the receiving node. Each connection specific pool is used for storing DTUs received over the associated connection. Thus, there is a connection specific pool of receive buffers reserved for each possible connection that may be established between the transmitting node and the receiving node.

A flow control circuit in the transmitting node guarantees that no DTU transmitted from the transmitting node to the receiving node is lost. The flow control circuit in the transmitting node further guarantees that when the number of active connections between the transmitting node and the receiving node does not exceed a predetermined number, there is optimal throughput between the transmitting node and the receiving node over all active connections.

The flow control circuit in the transmitting node includes a global counter to count the number of DTUs transmitted from the transmitting node to the receiving node, and not yet transferred out of the receive buffers in the receiving node. When the global counter exceeds the number of receive buffers in the common pool of receive buffers in the receiving node, the number of DTUs transmitted over each individual connection, and not yet transferred out of the receive buffers in the receiving node, is limited to the number of receive buffers in the connection specific pool of receive buffers associated with each one of the multiple connections between the transmitting node and the receiving node.

Advantages provided by the flow control system are apparent in the following example system, which in previous systems would have required rv receive buffers for each destination node, where r is the number of data transmission units that can be transmitted during the round trip delay between the transmitting node and the destination node, and v is the maximum possible number of potential VCs (virtual circuits) with each destination node. The system herein disclosed provides maximum throughput for a predetermined number x of VCs. The number x is thus equal to the number of active VCs allowed with the destination node, where each VC has maximum throughput. In this example, the number x can be much lower than v, since the number of active VCs with a given destination node is typically much less than $2^{14}$. If the link speed for the example embodiment is 622 megabits per second (Mb/s), a value for x could reasonably be 100, since more than 100 active VCs results in each VC getting less than approximately 6 Mb/s bandwidth of throughput.

The flow control system herein described allows maximum throughput on each active VC, at little additional design complexity, provided that the number of active VCs with each destination node is at most x. In an embodiment where the size of the connection specific pool of receive buffers is equal to one (1), the buffer requirement is v+rx, much less than rv. For example, if x is 100 the system would only require approximately 8 MB (megabytes) for receive buffers in a destination node 100 km away and 64 MB for receive buffers in a destination node 1000 km away.

The flow control circuit further includes logic providing fair and efficient allocation of receive buffers across all virtual circuits between a transmitting node and a destination node. The flow control circuit ensures that during steady state operation, all active virtual circuits get an approximately equal number of receive buffers in the receiving node, which are used to store data transmission units received from the transmitting node.

When the number of active VCs between the transmitting node and the receiving node is less than or equal to a predetermined number x, each of the active VCs is allocated r receive buffers in the destination node, where r is the number of data transmission units that can be transmitted during the round trip delay between the transmitting node and the destination node. Thus for numbers of active VCs less than or equal to x, each virtual circuit between the transmitting node and the destination node may obtain maximum throughput over all active VCs.

When the number m of active VCs between the transmitting node and the destination node exceeds a predetermined number x, each active VC with the remote node is allocated approximately $b_{max}/m$ receive buffers in the destination node, where $b_{max}$ is the number of receive buffers in the common pool of receive buffers in the destination node, minus the number of receive buffers in the connection specific pools of receive buffers associated with each one of the multiple connections between the transmitting node and the receiving node. For example, in an example embodiment using fixed sized cells for messages, one receive buffer per active VC should be reserved in each connection specific pool for deadlock prevention. If $b_{max}/m<1$, then each active VC between the transmitting node and the receiving node is allocated the number of receive buffers in the connection specific pool of receive buffers associated with each one of the multiple connections between the transmitting node and the receiving node. In this way the flow control circuit allocates buffers across all VCs between the transmitting node and destination node, in a highly fair and efficient manner.

These and other features and advantages of the present invention will become apparent from a reading of the detailed description in conjunction with the attached drawings in which like reference numerals refer to like elements in the several views.

DETAILED DESCRIPTION

Virtual Circuits

In computer networks, a logical connection between a first node and a second node is known as a virtual circuit. Virtual circuits are used to avoid having to make routing decisions for every message sent. Generally, when a virtual circuit is established, a route from the first node to the second node is chosen as part of the connection setup. That route is used for all subsequent traffic flowing over the connection.

To allow messages sent over a virtual circuit to always take the same route, each node along the route maintains a virtual circuit table with one entry per virtual circuit. Typically, each message travelling over a given virtual circuit contains a field or fields identifying the virtual circuit over which the cell is transmitted. Further, the field or fields in the message typically identify an entry in a virtual circuit table within each node along the route.

A virtual circuit table entry contains control bits for the associated virtual circuit, for example a control bit that enables and disables transmission on the associated virtual circuit. A discussion of virtual circuits is given in many textbooks, for example the book by Andrew S. Tanenbaum, "Computer Networks", Second Edition, published by Prentice-Hall, Inc., a division of Simon and Shuster, Englewood Cliffs, N.J., 1988, at pages 280 through 284, all disclosures of which are herein included by reference.

Virtual circuits are also used to reserve receive buffers in the first node and the second node, and within intermediate nodes between the first node and second node. In this way a virtual circuit is used to guarantee a predetermined level of throughput between the first node and the second node, without limitation due to a lack of receive buffers in a receiving node.

Messages and Data Transmission Units

Figure 1A:
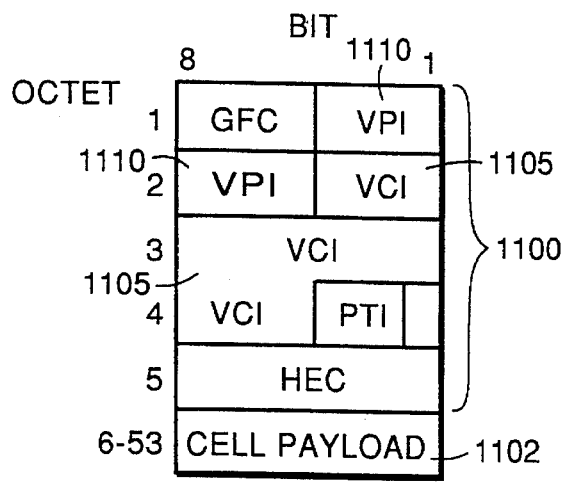
FIG. 1a is a diagram showing the format of an example message format.

FIG. 1a is a diagram showing the format of an example message known as a cell. A cell is one example of a message used to pass data and control information between network nodes. A cell is a fixed length message, of size equal to one Data Transmission Unit (DTU). Other types of messages, which may have variable length are "packets", and "frames". A packet or frame may have a size equal one or more DTUs. The description herein involves cells, however it will be evident to one skilled in the art of data and computer communications that the concepts disclosed may also be applied to systems using other types of messages, for example packets or frames.

The cell is used in communications systems based on Asynchronous Transfer Mode (ATM). A discussion of ATM is given in the tutorial by Anthony Alles "ATM in Private Networking", published by Hughes LAN Systems, Inc., 1992, see particularly pages 1 through 29, all disclosures of which are herein included by reference.

FIG. 1a shows a cell having a header 1100 within octets 1–5 of the cell, and a payload 1102 within octets 6–53. The header 1100 includes Virtual Channel Identifier (VCI) 1105, and Virtual Path Identifier (VPI) 1110. Together the VCI and VPI fields identify a virtual circuit over which the cell is transmitted. The payload 1102 contains data or control information.

Figure 1B:
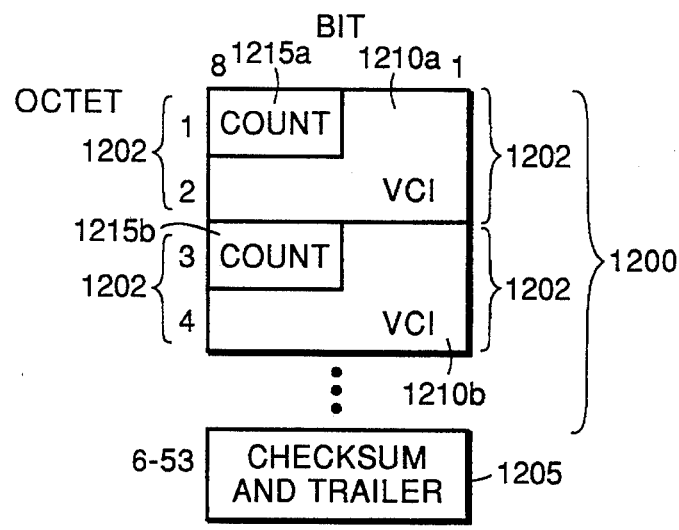
FIG. 1b is a diagram showing an example of a buffer released message.

FIG. 1b is a diagram showing a first example of a buffer released message. The example buffer released message of FIG. 1b indicates the availability of receive buffers in a receiving node to a transmitting node. For purposes of example, the buffer released message shown in FIG. 1b is a cell, having a body 1200, and a checksum and trailer field 1205. The body 1200 includes up to 24 entries 1202, including for example a first entry 1202a, and a second entry 1202b. Each entry contains a count field 1215, and a Virtual Circuit Identifier field 1210.

The count field 1215 for a given entry 1202 contains information regarding available receive buffers in the node from which the buffer released message was sent, for traffic on the virtual circuit indicated by the VCI field in the entry. Such information in the count field 1215 includes, for example, the total number of receive buffers currently available to store data received on the virtual circuit indicated by the VCI field 1210. In an alternative example embodiment, the count field 1215 includes the number of receive buffers which have become available to store data received on the virtual circuit indicated by the VCI field 1210 since the last buffer released message was sent.

Figure 1C:
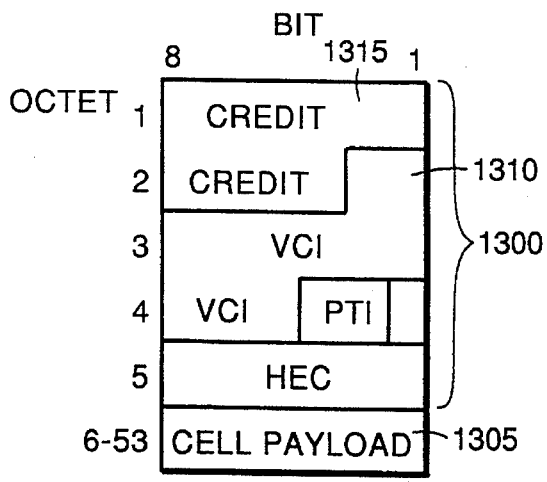
FIG. 1c is a diagram showing a second example of a buffer released message.

FIG. 1c is a diagram showing a second example of a buffer released message. The buffer released message of FIG. 1c is a cell, in which information regarding available receive buffers is piggy-backed. The buffer released message of FIG. 1c has a header 1300, and a payload 1305. The payload 1305 contains data or control information. The header 1300 includes a credit field 1315, and a Virtual Circuit Identifier (VCI) field 1310. The VCI field 1310 identifies the VC over which the buffer released message is transmitted.

Further with regard to FIG. 1c, the credit field 1315 includes information describing the number of available receive buffers in the node from which the buffer released message is transmitted. For example, such information in the credit field 1315 includes for example the total number of receive buffers currently available to store data received on the virtual circuit indicated by the VCI field 1310. In an alternative example embodiment, the credit field 1315 includes the number of receive buffers which have become available to store data received on the virtual circuit indicated by the VCI field 1310 since the last buffer released message was sent.

Flow Control System

Figure 1D:
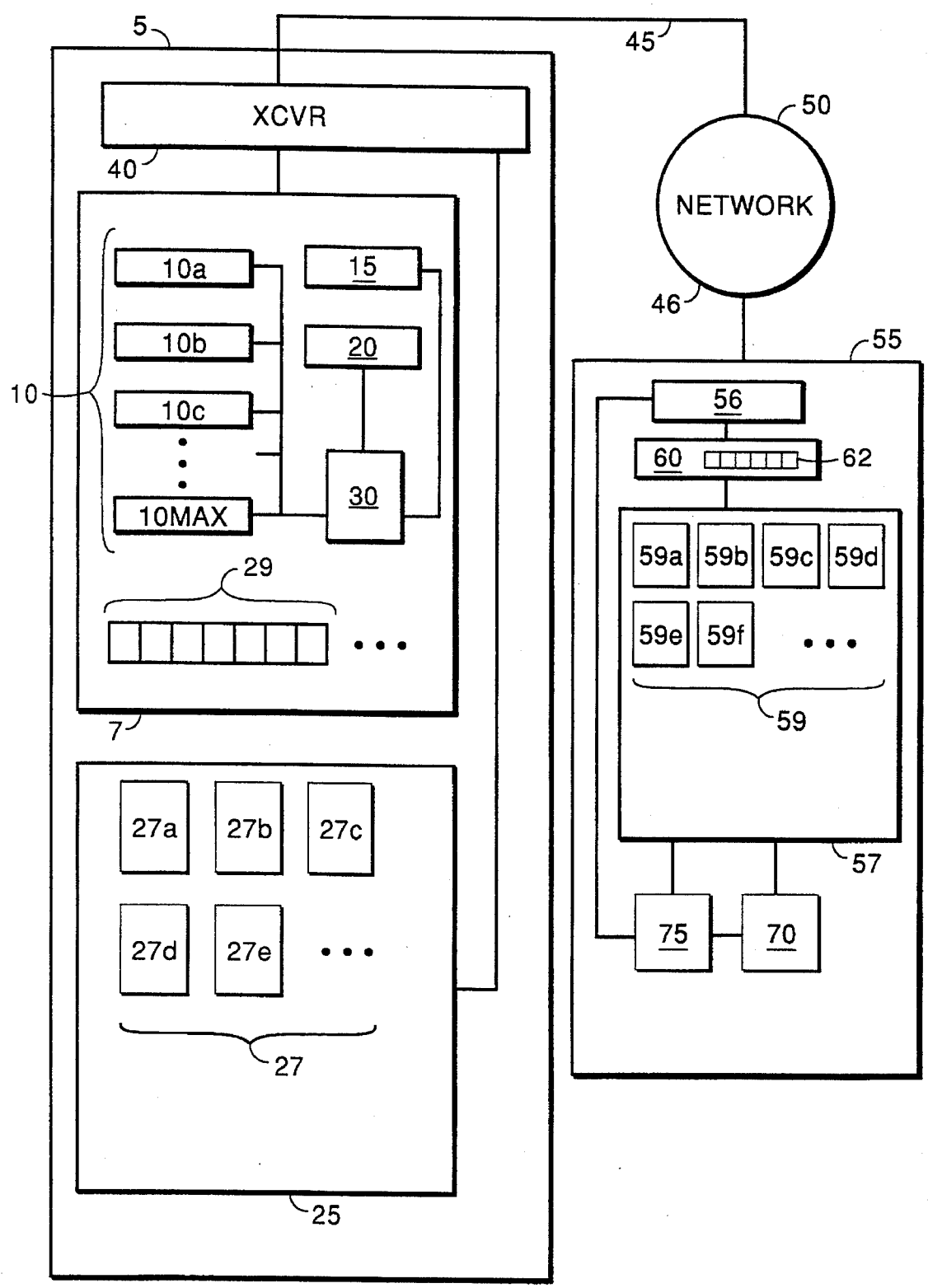
FIG. 1d is a logic drawing of a first embodiment of a flow control apparatus.

FIG. 1d is a logic drawing of the elements in a flow control apparatus. A first network node 5 is shown containing a transceiver circuit 40, a flow control circuit 7, and a memory 25. For purposes of example, the transceiver circuit 40 is shown coupled with a network 50 via a communications link 45. The transceiver circuit 40 is further coupled with the flow control circuit 7, and the memory 25.

The flow control circuit 7 contains a set of one or more virtual circuit outstanding DTU counters 10, including virtual circuit outstanding DTU counters 10a, 10b, 10c . . . 10max, where max is the maximum possible number of potential virtual circuits with a second node 55. The virtual circuit outstanding DTU counters 10, as well as a global limit register 20, and a global counter 15, are coupled with a flow control logic 30.

In the example embodiment of FIG. 1d, the virtual circuit outstanding DTU counters 10, global counter 15, and global limit register 20 are contained in the flow control circuit 7. Alternatively, it will be evident to those skilled in the art that some or all of virtual circuit outstanding DTU counters 10, global counter 15, and global limit register 20 may be memory locations allocated by a program running on a node processor (see FIG. 10). It will further be evident to those skilled in the art that the network 50 could be a local area network (LAN), a wide area network (WAN), a metropolitan area network (MAN), or other type of communications system.

The flow control circuit 7 further contains a virtual circuit table 29, having an entry for every possible virtual circuit between the first network node 5 and other network nodes, and a flow control logic 30.

The second network node 55 is coupled with the network 50, via a link 46. The second network node 55 includes a transceiver 56 coupled with the LAN 50 and also coupled with a second flow control circuit 60. The second flow control circuit 60 includes a virtual circuit table 62 having an entry for every possible virtual circuit between the second network node 55 and other network nodes. The second flow control circuit 60 is also coupled with a memory 57. The memory 57 in the second network node 55 includes a set of one or more receive buffers 59, for storing DTUs received from the first network node 5.

The total number of receive buffers 59 is equal to $$(v * min) + (x * r)$$

where $v$ is the maximum number of potential virtual circuits that can be established between the first network node 5 and the second network node 55, min is a minimum number of receive buffers, reserved as a connection specific pool for each potential virtual circuit between the first network node 5 and the second network node 55, $x$ is the number of virtual circuits that can be established for the link 46 with the first network node 5 before throughput between first network node 5 and second network node 55 is potentially limited by a lack of receive buffers, and $r$ is the number of DTUs that can be transmitted during one round trip delay between the first network node 5 and the second network node 55.

Thus each potential virtual circuit is reserved min receive buffers. Additionally, there is a shared pool $xr$ of receive buffers that is shared for DTUs received over any VC between the first network node 5 and the second network node 55. In an first example embodiment, min is equal to the number of receive buffers required to store one maximum sized message. In a second example embodiment, in which cells are used as messages, min is equal to 1 receive buffer, since every cell is of fixed size equal to one DTU. In a third example embodiment, min is equal to zero reserved receive buffers for each connection specific pool.

Also in the second network node 55 in FIG. 1d is shown a data transferring process 70, coupled with the memory 57. Further in network node 55 is shown a buffer released message generating process 75, coupled with the data transferring process 70 and the transceiver 56. The data transferring process 70 and buffer released message generating process 75 may be implemented with a variety of known technologies, for example as programs running on a node processor within the second network node 55, or as logic processes within an ASIC. In an example embodiment, the data transferring process 70 is a software process within an end node, for copying the data from the receive buffers 59 into user process memory. In an alternative example embodiment, the data transferring process 70 is a software or logic process within a switch, bridge or router for transferring data out of the receive buffers 59, and transmitting the data onto an output port.

The memory 25 in the first network node 5 further contains a set of one or more data messages 27, the data messages 27 containing data to be transmitted by the first network node 5 to the second network node 55.

It will be evident to those skilled in the art of computer and data communications that the flow control circuit 7, and the transceiver circuit 40 in the first network node 5, as well as the second flow control circuit 60, the data transferring process 70, the buffer released message generating process 75, and the transceiver 56 in the second network node 55, may be implemented using standard integrated circuit devices. A further discussion of such devices is given in many textbooks, for example "An Engineering Approach to Digital Design", by William I. Fletcher, published by Prentice-Hall, Englewood Cliffs, N.J., 1980, at pages 440 through 515, all disclosures of which are herein included by reference.

It will further be evident to one skilled in the art that the above listed elements may be implemented using one or more Application Specific Integrated Circuits (ASICs), or Programmable Logic Devices (PLDs). A further discussion of ASIC and PLD design is given in many textbooks, for example "VLSI Handbook", by Joseph DiGiacomo, published by McGraw-Hill Publishing Company, New York, 1989, at pages 17.3 through 22.13, all disclosures of which are herein included by reference.

During operation of the elements shown in FIG. 1d, first network node 5 and second network node 55 establish one or more virtual circuits with each other. For each virtual circuit between first network node 5 and second network node 55, there is an entry in virtual circuit table 29 within the first network node and an entry in virtual circuit table 62 within the second network node. Messages transmitted between the first network node 5 and the second network node 55 contain indication of a specific virtual circuit over which they are transmitted, for example a field containing a virtual circuit number indexing entries in the virtual circuit tables 29 and 62.

Within the first network node 5, the flow control logic 30 initializes each virtual circuit outstanding DTU counter 10 with zero when each virtual circuit is established. In an alternative embodiment, the virtual circuit outstanding DTU counter 10 for a specific virtual circuit is initialized to some number greater than zero if the bandwidth allocated for that specific virtual circuit is to be limited.

Again referring to the operation of the elements in FIG. 1d, the flow control logic 30 maintains the global counter 15 as the total number of outstanding DTUs transmitted from the first network node 5 to the second network node 55. Outstanding DTUs are those DTUs transmitted from the first network node 5 to the second network node 55, which have not been transferred by the data transfer process 70 in the second network node 55. As DTUs are transferred by the data transfer process 70 in the second network node 55, this is reported to the first network node 5 by a buffer released message transmitted from the second network node 55 to the first network node 5.

The flow control logic 30 also maintains the global limit register 20 based in part on the value in the global counter 15. There is a global counter and global limit register within the first network node 5 for each possible remote node with which the first network node 5 has one or more virtual circuits. In an example embodiment, in which the network 50 is a point to point link, then only the second network node 55 is reachable by the first network node 5. In that example embodiment, the first network node 5 has one global limit register and one global counter.

The flow control logic 30 initializes the global counter 15 and the global limit register 20 at power up, and whenever the link between the first network node 5 and the second network node 55 is broken and then subsequently re-established. In the example embodiment, the flow control logic 30 initializes the global counter to zero and the global limit register to r, where r is the number of DTUs that can be transmitted by the first network node 5 during the round trip propagation delay between the first network node 5 and the second network node 55.

Further during operation of the elements in FIG. 1, the transceiver 56 in the second network node 55 receives one of the data messages 27 transmitted by the first network node 5, and copies it into a subset of one or more of the receive buffers 59. Subsequently, the data transferring process 70 transfers the data from the subset of the receive buffers 59. The buffer released message generating process 75 then detects that the data was transferred from the subset of receive buffers, and sends a receive buffer released message to the first network node 5 indicating that the subset of one or more of the receive buffers 59 is available to store subsequent DTUs transmitted by the first network node 5.

Incremental and Absolute Feedback of Receive Buffer Usage in the Receiving Node

There are two alternative mechanisms for providing feedback from the second network node 55 to the first network node regarding the availability of the receive buffers 59: Incremental and Absolute. In an incremental feedback embodiment, the buffer released message generating process 75 reports the transfer of the receive buffers 59 to the first network node 5 either individually or in batches. For example, the buffer released message generating process 75 sends a buffer released message after each one of receive buffers 59 is transferred, or sends a buffer released message after every n of receive buffers 59 are transferred. Subsequent to receipt of the buffer released message by the first network node 5, the flow control logic 30 updates the virtual circuit outstanding DTU counters 10 as well as the global counter 15 and the global limit register 20.

In an absolute feedback embodiment, the buffer released message generating process 75 reports the total number of used receive buffers 59 for a given VC, either periodically, or when the total number of occupied receive buffers 59 exceeds a predetermined number.

Further in the absolute feedback embodiment, upon receipt of the buffer released message by the first network node 5, the flow control logic 30 in the first network node 5 corrects the number of buffers in the buffer released message for any DTUs transmitted by the first network node 5 to the second network node 55 during the last time period equal to one round trip delay between the two network nodes. This correction is accomplished by one of two alternative correction systems. In the first correction system, the flow control logic 30 keeps an actual count of the number of DTUs transmitted in the preceding round trip delay period. The flow control logic 30 accomplishes this by maintaining a running count of the DTUs being transmitted from first network node 5 to the second network node 55. When a buffer released message is received, the flow control logic 30 adds the actual number of DTUs transmitted during the round trip delay time preceding receipt of the buffer released message to the number of used buffers indicated by the buffer released message. This result is then used to update the appropriate virtual circuit outstanding DTU counter 10, as well as the global counter 15 and the global limit register 20.

In a second example correction system, the flow control logic 30 uses a conservative estimate approach to correct for any possible transmissions during the preceding round trip delay. To accomplish this the flow control logic 30 maintains a number num equal to the maximum possible number of DTUs that could be transmitted during one round trip delay between the first network node 5 and the second network node 55. When a buffer released message is received by the first network node 5, the flow control logic 30 adds num to the number of occupied receive buffers indicated in the buffer released message. The result of the addition is then used to update the appropriate virtual circuit outstanding DTU counter 10, as well as the global counter 15 and the global limit register 20.

Figure 2:
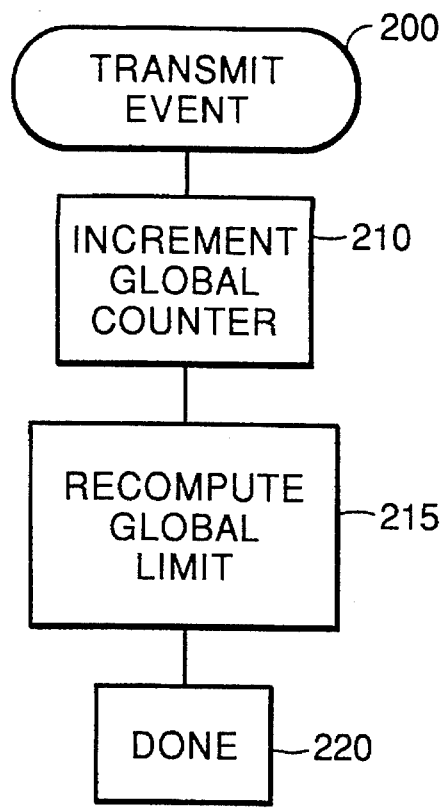
FIG. 2 is a flow chart showing the steps of a method for maintaining a global counter and a global limit register during transmission.

FIG. 2 shows the steps performed as one of data messages 27, (27a for purposes of example), is transmitted from first network node 5 of FIG. 1. The steps of FIG. 2 are performed by the flow control logic 30 shown in FIG. 1.

Now with reference to the elements shown in FIG. 1d and the steps in the control flow shown in FIG. 2, the operation of the elements in FIG. 1d is further described. In FIG. 2, data message 27a is transmitted by the first network node 5 to the second network node 55 in step 200. Next, in step 210, the flow control logic 30 responds to the transmission in step 200 by incrementing the global counter 15 by the number of DTUs in the data message 27a. In the example embodiment, the data message 27a is a cell, and consists of one DTU. In the example embodiment, the global counter 15 is therefore incremented by 1. Finally in step 215, the flow control logic 30 re-calculate the value of the global limit register 20 based on the value of the global counter 15.

After the data message 27a is transmitted from the first network node 5, it is received by the second network node 55. The transceiver 56 within the second network node 55 receives the data message 27a and writes the data message 27a into a subset of one or more of the receive buffers 59, for example receive buffer 59a.

Subsequent to the second network node 55 receiving and storing the data message 27a in receive buffer 59a, the data transferring process 70 in the second network node 55 transfers the data message out of receive buffer 59a. After the data transferring process has transferred the data message out of receive buffer 59a, the receive buffer 59a is available to store more data from the network 50, and is thus considered to be released. The buffer released message generating process 75 in the second network node 55 then provides indication of the availability of the released receive buffer 59a to the first network node 5 by sending a buffer released message to the first network node 5.

Figure 3:
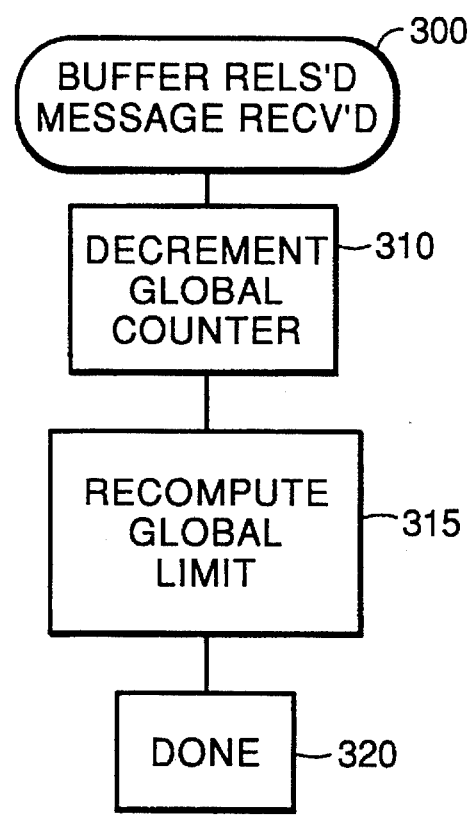
FIG. 3 is a flow chart showing steps of a method for maintaining a global counter and a global limit register during receipt of a buffer released message.

FIG. 3 shows the steps performed by the flow control logic 30, within the first network node 5 of FIG. 1d, when a buffer released message is received from the second network node 55. First the buffer released message is received in step 300. Next, the global counter 15 is decremented in step 310. The method for decrementing the global counter 15 is dependent on the type of feedback mechanism used. In an example embodiment where the incremental feedback mechanism is used, the amount the global counter 15 is decremented is the number of the receive buffers 59 that the buffer released message frame indicates have been released, either since the virtual circuit was established, or since the last buffer released message was sent from the second network node 55.

In an alternative example embodiment in which the absolute feedback mechanism is used, the buffer released message indicates a number of buffers equal to the number of receive buffers 59 in the second network node 55 occupied by data messages sent over the associated VC. The flow control logic 30 first corrects the number of receive buffers indicated in the buffer released message for any DTUs that may have been transmitted from the first network node 5 over the associated VC during the last round trip delay period. Then the global counter 15 is updated based on the corrected number of occupied receive buffers in the second network node 55.

Following step 310 in FIG. 3, the value of the global limit register 20 is recalculated in step 315 by the flow control logic 30 shown in FIG. 1d. The steps of re-computing the value of the global limit register 20 are described below. Following step 315, the processing of the received buffer release message completes in step 320, until the next buffer released message is received.

Figure 4:
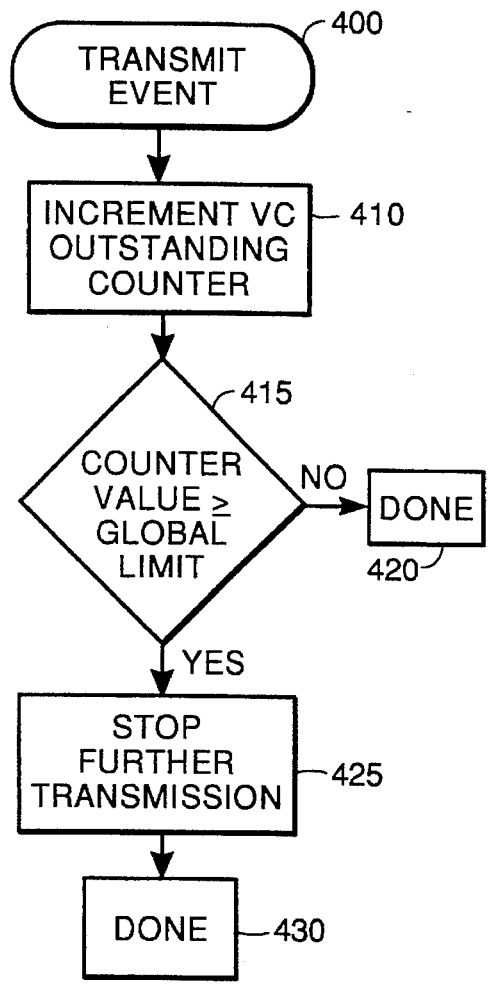
FIG. 4 is a flow chart showing steps of a method for maintaining an outstanding data transmission unit counter for a virtual circuit during transmission.

FIG. 4 shows the steps performed to maintain virtual circuit outstanding DTU counters 10 when one of data messages 27 is transmitted. The steps of FIG. 4 would be performed by the flow control logic 30 in the first network node 5 of FIG. 1.

First in FIG. 4, one of data messages 27 (for example 27a) is transmitted over a given virtual circuit between the first network node 5 and the second network node 55 in step 400. Next, the virtual circuit outstanding DTU counter 10 for that given virtual circuit (for example virtual circuit outstanding DTU counter 10a) is incremented in step 410 by the number of DTUs in the data message 27a. For example, if the data message 27a is a cell, having a length equal to 1 DTU, the outstanding DTU counter 10a is incremented by 1.

Next, in step 415 the virtual circuit outstanding DTU counter 10a is compared with the value of the global limit register 20. If the virtual circuit outstanding DTU counter 10a is less than the global limit register 20, processing completes for this transmission in step 420.

Further in FIG. 4, if the virtual circuit outstanding DTU counter 10a is greater than or equal to the global limit register 20, step 425 is performed. In step 425, the flow control logic 30 stops further transmission on the virtual circuit corresponding to virtual circuit credit counter 10a. Transmission on a virtual circuit can, in an example embodiment, be stopped by setting a Transmission Disable bit in the entry for that virtual circuit in the virtual circuit table 29 of FIG. 1. Following step 425, the process completes for this transmission in step 430.

Figure 5:
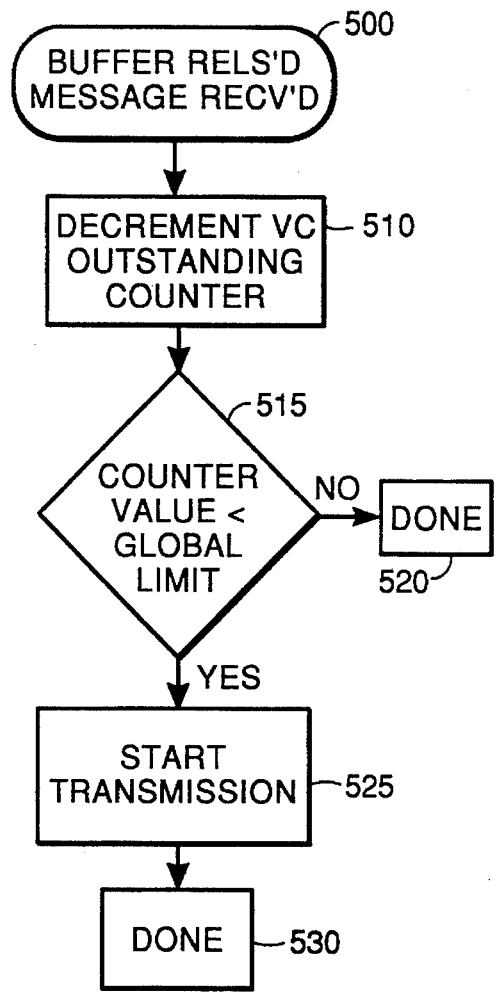
FIG. 5 is a flow chart showing steps of a method for maintaining an outstanding data transmission unit counter for a virtual circuit during receipt of a credit return frame.

FIG. 5 shows the steps performed to maintain the virtual circuit outstanding DTU counters 10 of the first network node 5 in FIG. 1 when a buffer released message is received. First in step 500, a buffer released message is received by the first network node 5. Next, in step 510, the flow control logic 30 writes or decrements the one of virtual circuit outstanding DTU counters 10, for example virtual circuit outstanding DTU counter 10a, indicated by the buffer released message.

Whether the virtual circuit outstanding DTU counter 10a is decremented or written in step 510 depends on whether an incremental or absolute feedback mechanism is used. In an embodiment where an incremental feedback mechanism is used, the virtual circuit outstanding DTU counter 10a is decremented by the number of receive buffers 57 that the buffer released message indicates has been released.

Where an absolute feedback mechanism is used, the buffer released message contains a current value reflecting the number of receive buffers 59 in the second network node 55 that are currently storing data received over the VC associated with the buffer released message. In that mechanism, the virtual circuit outstanding DTU counter 10a is written with the current value corrected for the round trip delay between the first network node 5 and the second network node 55.

Continuing with reference to the elements in FIG. 5, step 510 is next followed by step 515. In step 515, the flow control logic 30 compares the virtual circuit outstanding DTU counter 10a with the value of the global limit register 20. If the value of the virtual circuit outstanding DTU counter 10a is not less than the global limit register 20 then the process completes in step 520 for this buffer released message.

If the value of the virtual circuit outstanding DTU counter 10a is less than the global limit register 20, then the flow control logic 30 continues processing with step 525. In step 525, if transmissions for the virtual circuit corresponding with virtual circuit outstanding DTU counter 10a had previously been disabled, transmissions are re-enabled for that virtual circuit. Following step 525, the process completes for this buffer released message in step 530.

Figure 6:
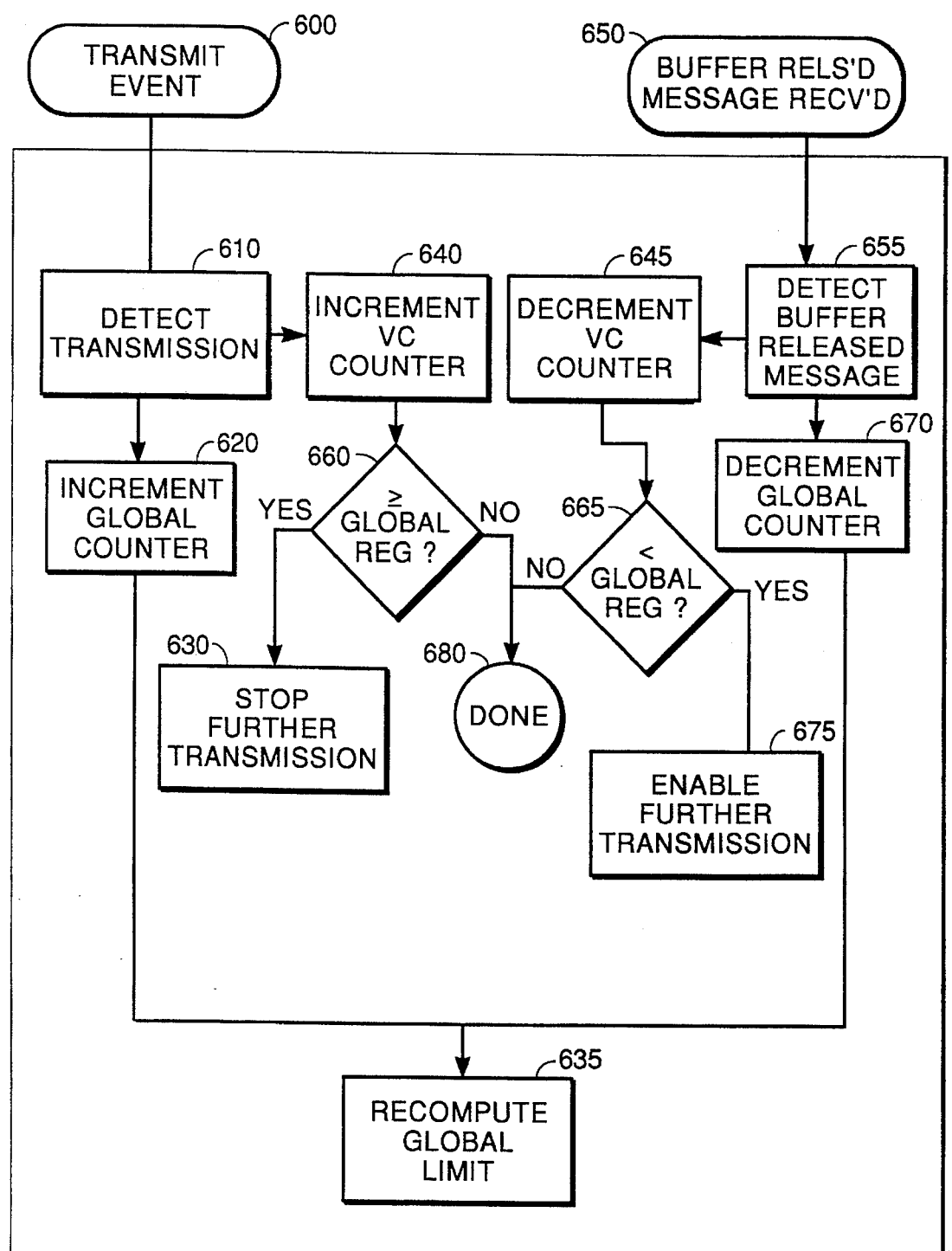
FIG. 6 is a detailed logic diagram of the flow control logic shown in FIG. 1d.

FIG. 6 is a detailed logic diagram of the flow control logic 30 shown in FIG. 1d. In the example embodiment of FIG. 6, the flow control logic 30 is an ASIC, containing several logic processes. FIG. 6 shows the flow control logic 30 having a transmission event detecting process 610, coupled with a virtual circuit counter incrementing process 640 and a global counter incrementing process 620. The virtual circuit incrementing process 640 is coupled with a first comparison process 660. The global counter incrementing process 620 is coupled with a global limit re-computing process 635. The first comparison process 660 is coupled with a transmission stopping process 630.

FIG. 6 further shows a buffer released message detecting process 655, coupled with a virtual circuit counter decrementing process 645 and a global counter decrementing process 670. The virtual circuit decrementing process 645 is coupled with a second comparison process 665. The global counter decrementing process 670 is coupled with the global limit re-computing process 635. The second comparison process 665 is coupled with transmission enabling process 675.

During operation of the elements in FIG. 6, when a transmission event 600 occurs, the transmission event detecting process 610 detects the transmission event 600. For example, a transmission event 600 follows a request by a user in a first network node to send a cell to a second network node over a virtual circuit between the first network node and the second network node. The transmission event is then detected when the transmission of the cell from the first network node occurs.

Following the transmission event detecting process 610 detecting the transmission event 600, the global counter incrementing process 620 increments the global counter by the number of DTUs transmitted. Next the global limit re-computing process 635 re-calculates the value of the global limit register for the destination node of the transmission, for example, the second network node. Also following the transmission event detecting process 610 detecting the transmission event 600, the virtual circuit counter incrementing process 640 increments the virtual circuit outstanding DTU counter for the virtual circuit on which transmission occurs.

Following the virtual circuit counter incrementing process 640 incrementing the virtual circuit outstanding DTU counter for the virtual circuit of the transmission event 600, the incremented virtual circuit outstanding DTU counter is compared with the value of the global limit register for the second network node. If the incremented virtual circuit outstanding DTU counter is greater than or equal to the global limit register, then the transmission stopping process 630 stops further transmissions on that virtual circuit. In an example embodiment, the current transmission is also stopped. In an alternative example embodiment, the current transmission is allowed to complete. If the incremented virtual circuit outstanding DTU counter is less than the global limit register, then the transmission is allowed to complete, and the cell transmitted from the first network node to the second network node.

In an example embodiment, the logic processes 620 and 635 may execute in parallel with the logic processes 640, 660, and 630, subsequent to the transmission event detecting process 610 detecting a transmission event.

Further during operation of the elements of FIG. 6, when a buffer released message is received by the first network node, receipt 650 of the buffer released message is detected by the buffer released message detecting process 655. An example of a buffer released message is a cell received from a second network node, over a virtual circuit, indicating the number of receive buffers that have been released since a previous buffer released message was sent from the second network node.

Following the buffer released message detecting process 655 detecting the receipt 650 of the buffer released message, the global counter decrementing process 670 decrements the global counter for the second network node from which the buffer released message was received. Subsequent to the global counter decrementing process 670 decrementing the global counter, the global limit recalculating process 635 recalculates the value of the global limit register for the second network node.

Also following the buffer released message detecting process 655 detecting the receipt 650 of the buffer released message, the virtual circuit counter decrementing process 645 decrements the outstanding DTU counter for the virtual circuit on which the buffer released message was received. After completion of the virtual circuit counter decrementing process 645, the second comparison process 665 compares the decremented outstanding DTU counter with the global limit register. If the decremented outstanding DTU counter for the virtual circuit over which the buffer released message was received is less than the global limit register, and transmission had previously been disabled on that virtual circuit, then the transmission enabling process 675 will enable transmission on that virtual circuit.

Re-computing the Global Credit Limit

Figure 7:
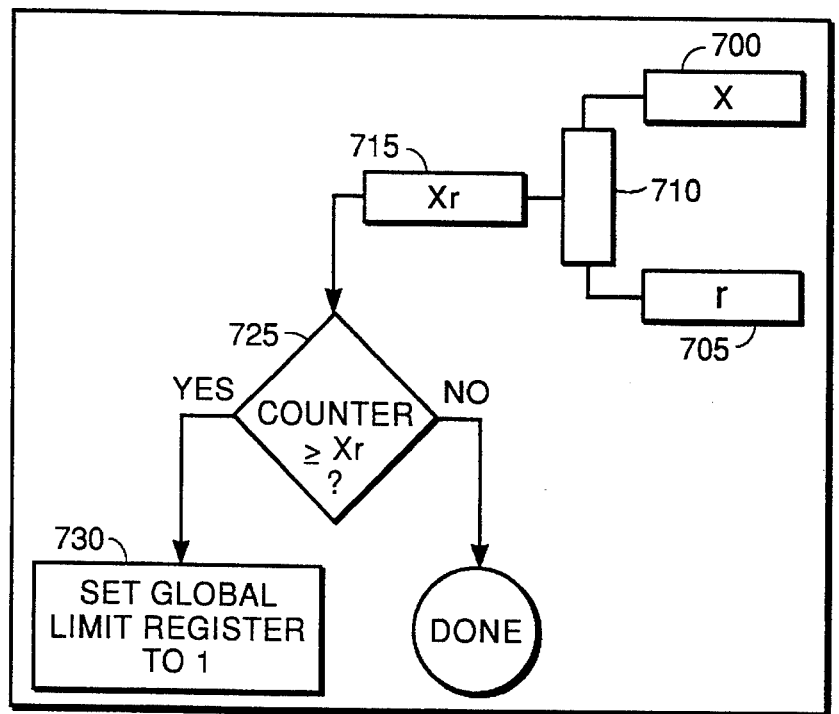
FIG. 7 is a detailed logic diagram of an embodiment of the logic for re-computing the global limit shown in FIG. 6.

FIG. 7 is a detailed logic diagram of the logic process 635 from FIG. 6, in which the value of the global limit register is recalculated when a message is transmitted, and when a buffer released message is received. The elements in FIG. 7 set the value of the global credit limit register to 1 whenever the value of the global counter is greater than or equal to xr, where x is the number of virtual circuits which have maximum throughput between a first network node and a second network node, and r is the number of DTUs that can be transmitted during the round trip delay between the first network node and the second network node.

Further with reference to FIG. 7, a first register 700 is shown having a value x, x being equal to the number of active virtual circuits which are allowed maximum throughput between the network node and the second network node. A second register 705 is shown having a value r, r being equal to the number of DTUs that can be transmitted during the round trip delay between the first network node and the second network node.

An Arithmetic Logic Unit (ALU) 710 is shown coupled with the first register 700 and the second register 705. The ALU 710 is further coupled with an output register 715. The output register 715 is coupled with a comparison process 725. The comparison process 720 is coupled with a global limit setting process 730.

During operation of the elements in FIG. 7, the ALU multiplies the values in the first register 700 and the second register 705, and writes the result, xr, into the output register 715. Next, the comparison process 725 compares the value in the output register 715 with the value of the global counter for the second network node. When the value of the global counter for the second network node is greater than or equal to the value in the output register 715 (xr), the global limit setting process 730 sets the global limit register for the second network node to one.

Figure 8:
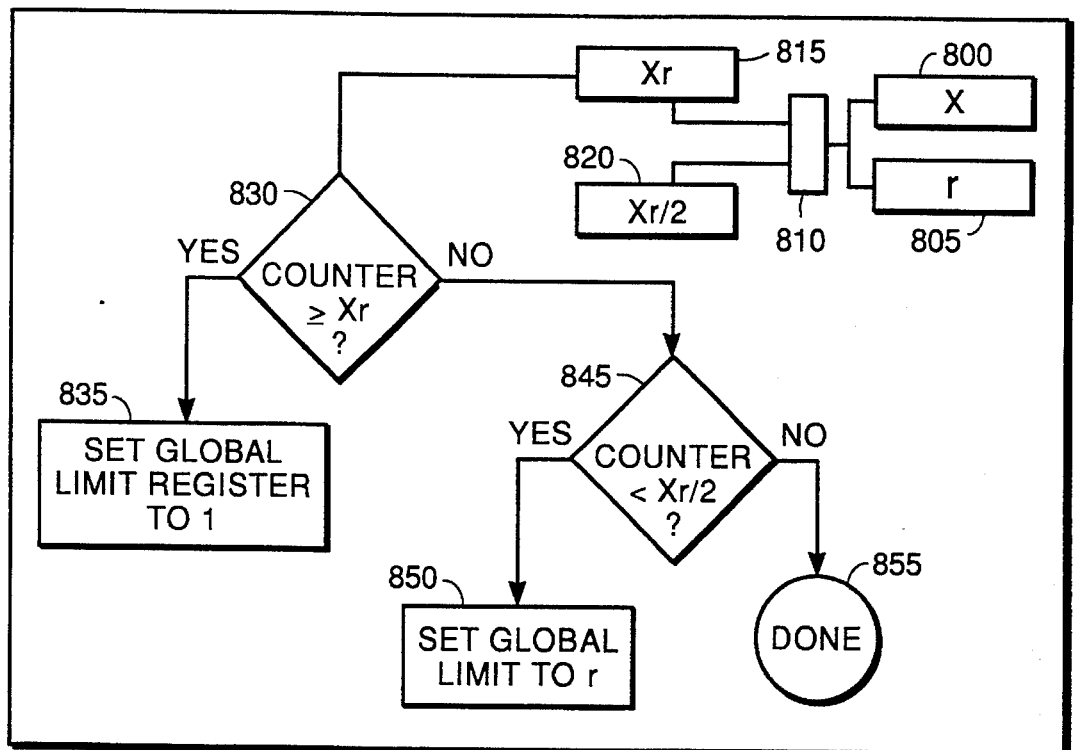
FIG. 8 is a detailed logic diagram of an alternative embodiment of the logic for re-computing the global limit shown in FIG. 6.

An alternative embodiment of the logic process 635 shown in FIG. 7 are shown as a logic diagram in FIG. 8. FIG. 8 is a detailed logic diagram of the logic process 635 from FIG. 6. The embodiment shown in FIG. 8 builds hysteresis into the embodiment shown in FIG. 7. First, some low water mark, for example xr/2, is determined. As in FIG. 7, the global credit limit is set to 1 whenever the global counter equals or exceeds xr, but it is set back to r only when the global counter falls below the low water mark, for example xr/2.

Further with reference to FIG. 8, a first register 800, having a value x, and a second register 805, having a value r, are coupled with an ALU 810. The ALU 810 is further coupled with a first output register 815 and a second output register 820. The first output register 815 and second output register 820 are coupled with a first comparison process 830. The first comparison process 830 is coupled with a global limit register setting process 835, and a second comparison process 845. The second comparison process 845 is coupled with a second global limit register setting process 850.

During operation of the elements shown in FIG. 8, the ALU 810 multiplies contents of the first register 800 and the contents of the second register 805, and passing the result, xr, into the first output register 815. The ALU 810 further divides the value of first output register by two, and passing the result, xr/2, into the second output register 820.

Further during operation of the elements shown in FIG. 8, subsequent to the ALU 810 passing the results into the first output register 815 and second output register 820, the first comparison process 830 compares the value of the global counter with xr. When the global counter is greater than or equal to the xr, the global limit setting process 835 sets the global limit register to 1. When the global counter is less than xr, the second global limit setting process 850 sets the global limit register to r.

Further with regard to the logic process 635 of FIG. 6, typical incremental feedback mechanisms include a synchronization scheme which is executed periodically in order to compensate for any acknowledgement messages that may be lost. Such synchronization schemes can be applied in a straightforward fashion since the global counter value is the sum of the individual VC counter values. Simply, any correction made by the particular synchronization method is applied also to the global counter value. For example, if the VC is torn down and replaced for synchronization purposes, its last global counter value is subtracted from the global counter.

Receive Buffer Organization

Figure 9:
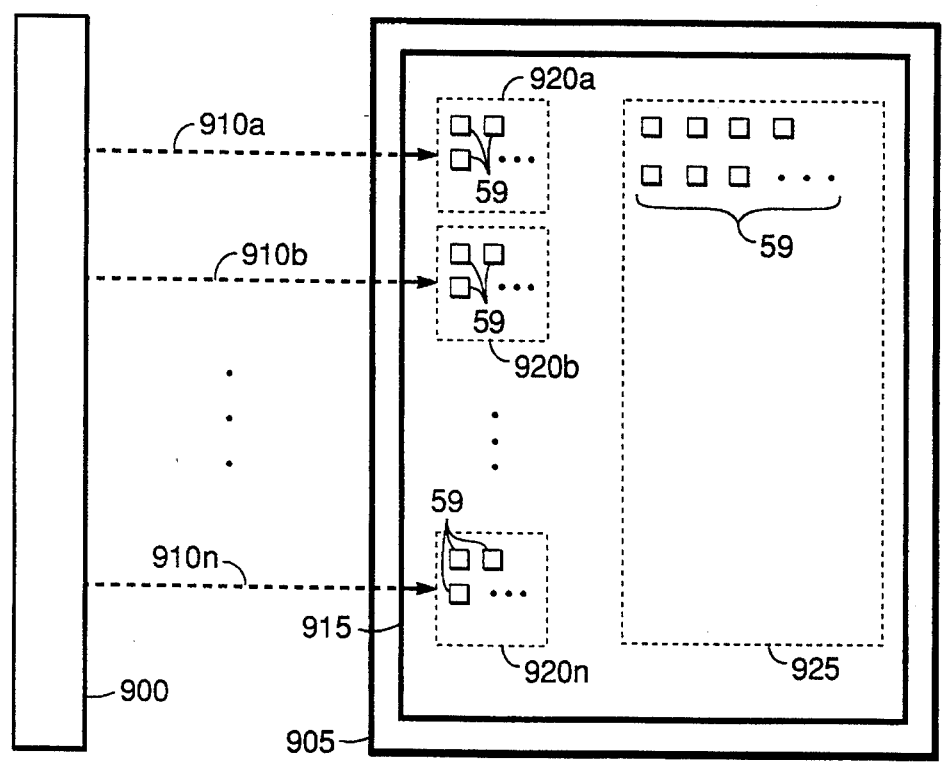
FIG. 9 is a drawing of a memory in a network node showing the allocation of receive buffers.

FIG. 9 shows a more detailed drawing of the receive buffers 59 shown in FIG. 1d. In FIG. 9, a first network node 900, and a second network node 905, have a number of virtual circuits 910a, 910b through 910n between them. A memory 915 in the second network node 905 contains receive buffers 59 for storing DTUs received from the first network node 900, over the virtual circuits 910. Each of the virtual circuits 910 is associated with a virtual circuit pool of receive buffers 920. For example, virtual circuit 910a is associated with virtual circuit pool 920a. In addition to the virtual circuit pools 920, there is a common pool of receive buffers 925, associated with all the virtual circuits 910 with the first network node 900.

In an example embodiment, the number of receive buffers 59 in each of the virtual circuit pools 920 is equal to one. Further in an example embodiment, the number of receive buffers 59 in the common pool 925 is equal to xr, where x is a number of virtual circuits which have maximum throughput, and r is the number of DTUs that can be transmitted during one round trip delay period between the first network node 900 and the second network node 905. The number of virtual circuit pools 920 is equal to the maximum number of potential virtual circuits between the first network node 900 and the second network node 905.

During operation of the elements shown in FIG. 9, the first network node 900 sends DTUs to the second network node 905 over the virtual circuits 910. DTUs sent over virtual circuit 910a are stored in those receive buffers 59 within the virtual circuit pool 920a, and in those receive buffers 59 in the common pool 925. Similarly, DTUs sent over virtual circuit 910b are stored in those receive buffers 59 within the virtual circuit pool 920b, and in those receive buffers 59 in the common pool 925.

Node Processor Based Embodiment

Figure 10:
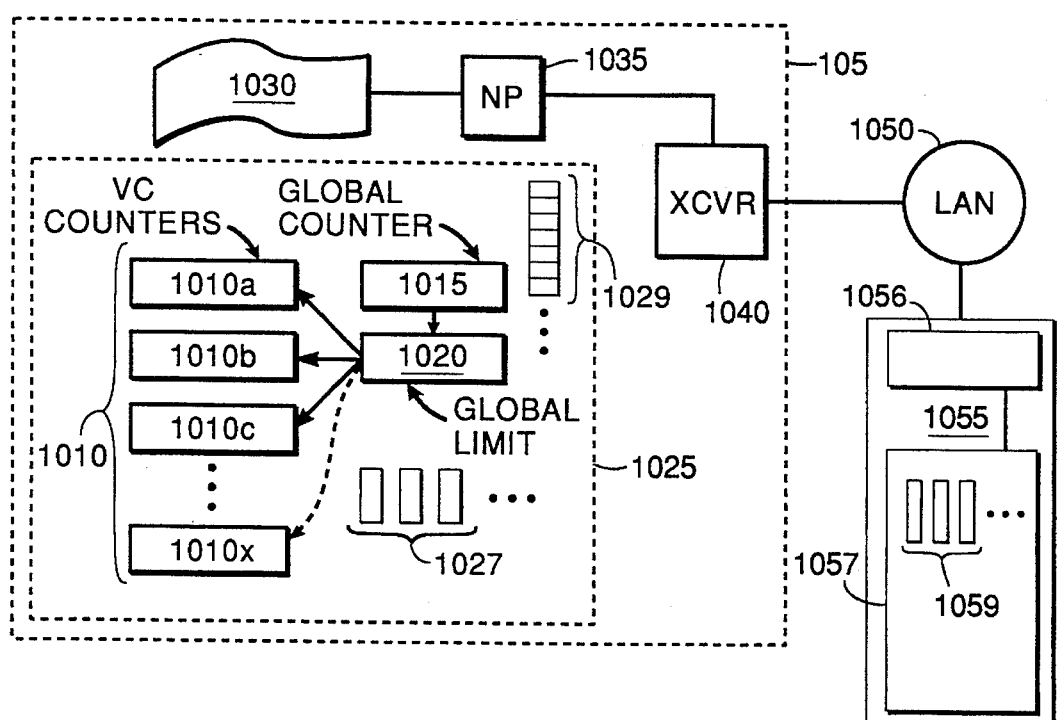
FIG. 10 is a logic drawing of an alternative embodiment of the flow control apparatus.

FIG. 10 is a logic drawing of the elements in a flow control apparatus for a communications link within a network node 1005. A plurality of virtual circuit outstanding DTU counters 1010, consisting of virtual circuit outstanding DTU counters 1010a, 1010b, 1010c ... 1010max, are shown coupled with a global register 1020. The number of virtual circuit outstanding DTU counters max is the maximum possible number of virtual circuits on the communications link.

In the example embodiment of FIG. 10, the virtual circuit outstanding DTU counters 1010, global counter 1015, and global register 1020 are shown contained in a memory 1025. Alternatively, some or all of virtual circuit outstanding DTU counters 1010, global counter 1015, and global register 1020 could be implemented as hardware registers. Further in the example embodiment of FIG. 10 are shown a node processor 1035, coupled with the memory 1025, a program 1030 running on the node processor 1035, and a transceiver circuit 1040, coupled with the node processor and a network 1050.

It will be evident to one skilled in the art of data and computer communications that the network 1050 could be a local area network (LAN), a wide area network (WAN), a metropolitan area network (MAN), or other type of communications system.

A second network node 1055 is also shown coupled with the LAN 1050. The second network node 1055 includes a transceiver 1056 coupled with the network 1050 and also coupled with a memory 1057. The memory 1057 in the second network node 1055 includes a set of one or more receive buffers 1059, for storing data received from the network 1050.

It will be evident to one skilled in the art of data and computer communications that a alternative embodiments to the example embodiment in FIG. 10 include implementations based on other currently available technologies, for example an application specific integrated circuit (ASIC) to perform some or all of the functions performed by the program 1030 running on the node processor 1035. The selection of whether to have the functions performed by the node processor 1035, ASIC, or other type of currently available technology is based on implementation specific trade-offs, for example taking into account the expense of using an ASIC as balanced against the generally faster processing speeds achievable with an ASIC.

The memory 1025 further contains a virtual circuit table 1029, having an entry for each virtual circuit between the network node 5 and other network nodes on the network 1050, and a set of one or more data messages 1027, containing data to be transmitted by the network node 1005 to other nodes on the network 1050.

During operation of the elements shown in FIG. 10, the program 1030 executes on the node processor 1035. The functions performed by the program 1030 are the functions performed by the flow control logic 30 shown in the embodiment of FIG. 1d.

Step-Wise Global Limit Setting

Figure 11:
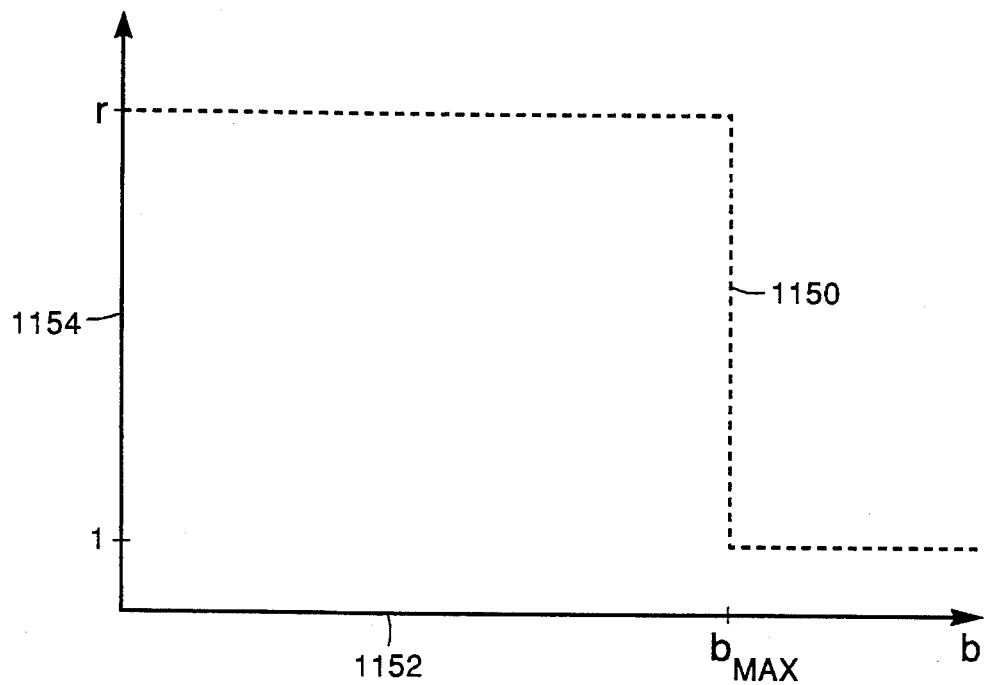
FIG. 11 is a graph showing values of the global limit register in an embodiment using step-wise global limit setting.

During operation of the embodiments in FIGS. 7 and 8, the global limit alternates between the value 1 and the value r. In this way, the global limit is a step-wise function of the global counter value. FIG. 11 shows the values of the global limit register, as a function of the total number of available receive buffers in a receiving second node, during operation of the embodiments in FIGS. 7 and 8 in a transmitting first node. The horizontal axis 1152 of the graph in FIG. 11 represents the total number of receive buffers in the second node storing buffers transmitted from the first node. The horizontal axis 1152 is therefore equal to the count b of outstanding DTUs maintained in the global counter of the first node. The vertical axis 1154 represents values of the global limit register in the first node. The dotted line 1100 shows the values of the global limit register in the first node as a function of the values of the global counter in the first node.

As shown in FIG. 11, during operation of the embodiments of FIGS. 7 and 8, the global limit register in the first node is set to 1 when the value of the global counter in the first node exceeds a value $b_{max}$. The value $b_{max}$ is a maximum number of receive buffers in the second node that may be used to store data transmission units from the first node.

In a first example embodiment, $b_{max}$ is equal to xr, where x is the number of virtual circuits that can be established with the second node before throughput between the first node and the second node is potentially limited by a lack of receive buffers. Further in the first example embodiment, r is the number of DTUs that can be transmitted during one round trip delay between the first node and the second node.

In a second example embodiment, $b_{max}$ is the total number of receive buffers in the destination node for storing data transmission units received from the first node, minus one buffer reserved per virtual circuit between the first node and the second node for deadlock prevention. When the value of the global counter drops back below $b_{max}$, the global limit register is set to r.

The embodiments of FIG. 7 and FIG. 8 are thus seen to use a system of step-wise global limit setting, indicated by the step-wise values of the global limit register of dotted line 1150 in FIG. 11. Systems using step-wise global limit setting may suffer from unfairness when the number of active virtual circuits exceeds x, where x is the predetermined number of virtual circuits which may be active allowing maximum throughput.

An example of the unfairness in a system using step-wise global limit setting is now described. During operation where the system in a first node has x active virtual circuits with a second node, each virtual circuit may have an outstanding DTU counter equal to the value of the global limit register, such that all of the virtual circuits have used all of the available destination buffers in the second node. In such a case, when an x+1 virtual circuit becomes active, the global counter will eventually exceed $b_{max}$, and the global limit will be set to 1. At this point in time, the original x virtual circuits will be occupying on average r receive buffers in the second node, while the x+1 virtual circuit will occupy 1 receive buffer in the second node. Subsequently, the global counter will drop below $b_{max}$, and the global limit will once again become r. At this point in time, the original x active virtual circuits will still be occupying on average r receive buffers in the second node, and the x+1 virtual circuit will have a chance to claim some number greater than 1 of receive buffers in the second node. The global counter will then exceed $b_{max}$ again, and the global limit will drop to 1 again. It is unlikely that during the time where the global counter is less than $b_{max}$ that the x+1 virtual circuit will have a chance to reach anywhere near r receive buffers in the second node. Thus an unfairness exists between the number of receive buffers in the second node available to the first x virtual circuits with the second node, and the number of receive buffers in the second node available to the x+1 and subsequent virtual circuit with the second node.

Smooth Global Limit Setting

Figure 12:
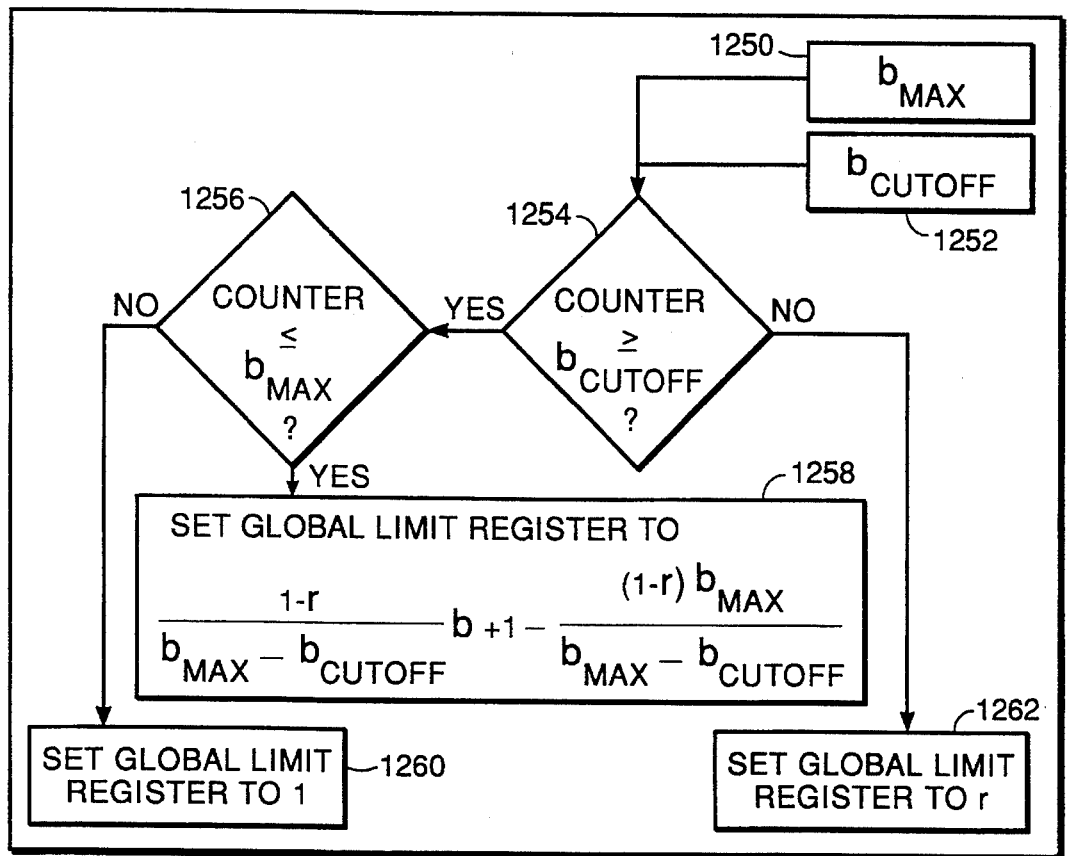
FIG. 12 is a detailed logic diagram of an embodiment of the logic for re-computing the global limit shown in FIG. 6 and using smooth global limit setting.

FIG. 12 is a detailed logic diagram of an alternative embodiment of the global limit re-computing logic process 635 from FIG. 6, in which the value of the global limit register is recalculated when a message is transmitted, and when a buffer released message is received. The embodiment in FIG. 12 uses smooth global limit setting.

FIG. 12 shows an alternative embodiment of logic process 635 for re-computing the value of global limit register. The logic process 635 of FIG. 12 includes a first register 1250 for storing the value $b_{max}$, and a second register 1252 for storing the value $b_{cutoff}$. The first register 1250 and the second register 1252 are coupled with a first comparison process 1254. The first comparison process is coupled with a first global limit setting process 1262 and a second comparison process 1256. The second comparison process 1256 is coupled with a second global limit setting process 1258 and a third global limit setting process 1260.

During operation of the elements shown in FIG. 12, the first comparison process 1254 determines if the value of the global counter is greater than or equal to $b_{cutoff}$ as stored in the register 1252. Subsequent to the determination of first comparison process 1254, if the value of the global counter is greater than or equal to $b_{cutoff}$, then control passes to a second comparison process 1256. If the value of the global counter is not greater than or equal to $b_{cutoff}$, then control passes to first global limit setting process 1262.

Second comparison process 1256 determines whether the global counter is less than or equal to $b_{max}$. Subsequent to the determination of second comparison process 1256, if the global counter is less than or equal to $b_{max}$, then control passes to second global limit setting process 1258. Further subsequent to the determination of second comparison process 1256, if the global counter is not less than or equal to $b_{max}$, the control passes to third global limit setting process 1260.

First global limit setting process 1262 is performed or executed when the global counter is not greater than or equal to $b_{cutoff}$. First global limit setting process 1262 sets the global limit to r, where r is the number of data transmission units that can be transmitted from the first node to the second node during one round trip delay period between the first node and the second node.

Second global limit setting process 1258 is performed or executed when the global counter is greater than or equal to $b_{cutoff}$, and less than or equal to $b_{max}$. Second global limit setting process 1258 sets the global limit based on the following equation.

$$\text{Global Limit} = \frac{1-r}{b_{max} - b_{cutoff}} b + 1 - \frac{(1-r) b_{max}}{b_{max} - b_{cutoff}}$$

where b is the value of the global counter.

Third global limit setting process 1260 is performed or executed when the global counter greater than or equal to $b_{cutoff}$, and not less than or equal to $b_{max}$. Third global limit setting process 1260 sets the global limit to 1 (one).

Figure 13:
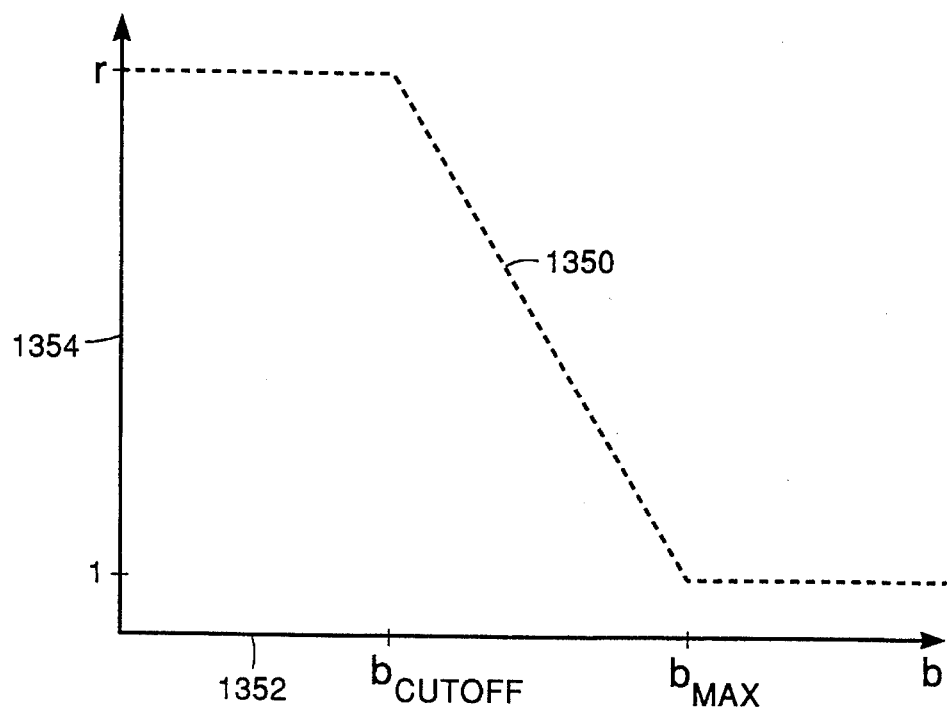
FIG. 13 is a graph showing values of the global limit register in an embodiment using smooth global limit setting.

FIG. 13 shows the values of the global limit register as a function of the global counter, as would result during operation of the example embodiment of FIG. 12. The example embodiment of FIG. 12 uses smooth global limit setting.

During operation of the embodiment in FIG. 12, the global limit varies smoothly between the value r and the value 1 when the global counter value is between a low value $b_{cutoff}$ and a higher value $b_{max}$. The value 1 in FIG. 12 is equal to the number min of reserved receive buffers in each connection specific pool in the receiving node. In an alternative embodiment to the embodiment of FIG. 12, the global limit varies smoothly between the value r and the value 0 when the global counter value is between the low value $b_{cutoff}$ and the higher value $b_{max}$.

FIG. 13 shows the values of the global limit register, as a function of the number of receive buffers in a second node storing data transmission units received from a first node, during operation of the embodiment in FIG. 12 in the first node. The horizontal axis 1302 of the graph in FIG. 13 represents the total number of receive buffers in the second node storing buffers transmitted from the first node. The horizontal axis 1352 is therefore equal to the value of the global counter in the first node. The vertical axis 1354 represents values of the global limit register in the first node. The dotted line 1350 is the values of the global limit register in the first node as a function of the values of the global counter in the first node.

As seen in FIG. 13, during operation of the embodiment of FIG. 12, the global limit register in the first node is set to 1 when the value of the global counter in the first node exceeds a value $b_{max}$. The value $b_{max}$ is a maximum number of receive buffers in the second node that may be used to store data transmission units from the first node.

In a first example embodiment, $b_{max}$ is equal to xr, where x is the number of virtual circuits that can be established with the second node before throughput between the first node and the second node is limited by a lack of receive buffers. Further in the first example embodiment, r is the number of DTUs that can be transmitted during one round trip delay between the first node and the second node. In a second example embodiment, $b_{max}$ is the number of receive buffers in a common buffer pool in the destination node for storing data transmission units received from the first node, minus sufficient received buffers reserved per virtual circuit between the first node and the second node to ensure deadlock prevention.

Further during the operation of the elements in FIG. 13, when the value of the global counter is between a value $b_{cutoff}$ and the value $b_{max}$, the global limit register is set based on the following equation.

$$\text{Global Limit} = \frac{1-r}{b_{max} - b_{cutoff}} b + 1 - \frac{(1-r) b_{max}}{b_{max} - b_{cutoff}}$$

where b is the value of the global counter. When the global counter value drops back below $b_{cutoff}$, the global limit register is set to r.

The embodiment of FIG. 12 is thus seen to use a system of smooth global limit setting, as shown by the smooth values of the global limit register of dotted line 1350 in FIG. 13. Systems using smooth global limit setting do not suffer from unfairness when the number of active virtual circuits exceeds x, where x is the predetermined number of virtual circuits which may be active allowing maximum throughput.

In the embodiment of FIG. 12, a significant advantage of fairness is achieved. When the value of the global counter in a first node is greater than or equal to $b_{cutoff}$ and less than or equal to $b_{max}$, the global limit is gradually and smoothly lowered between r and 1. Thus the limitation of receive buffers in a second node is spread evenly across all active VCs with the second node. At any given point in time, the global counter is said to contain a value within one of three value ranges. The first value range consists of values less than $b_{cutoff}$. The second value range is greater than $b_{cutoff}$ but less than $b_{max}$, and the third value range consists of values greater than $b_{max}$. Where the traffic on the system is such that the value of the global counter changes between the three value ranges substantially less frequently than the rate at which the global limit is re-calculated by the particular implementation, then if there are y active virtual circuits at a given point in time, the global limit would eventually settle to approximately the following equation:

$$\text{global limit} = \frac{b_{max} - b_{cutoff} - (1-r) * b_{max}}{b_{max} - b_{cutoff} - (1-r) * y}$$

Figure 14:
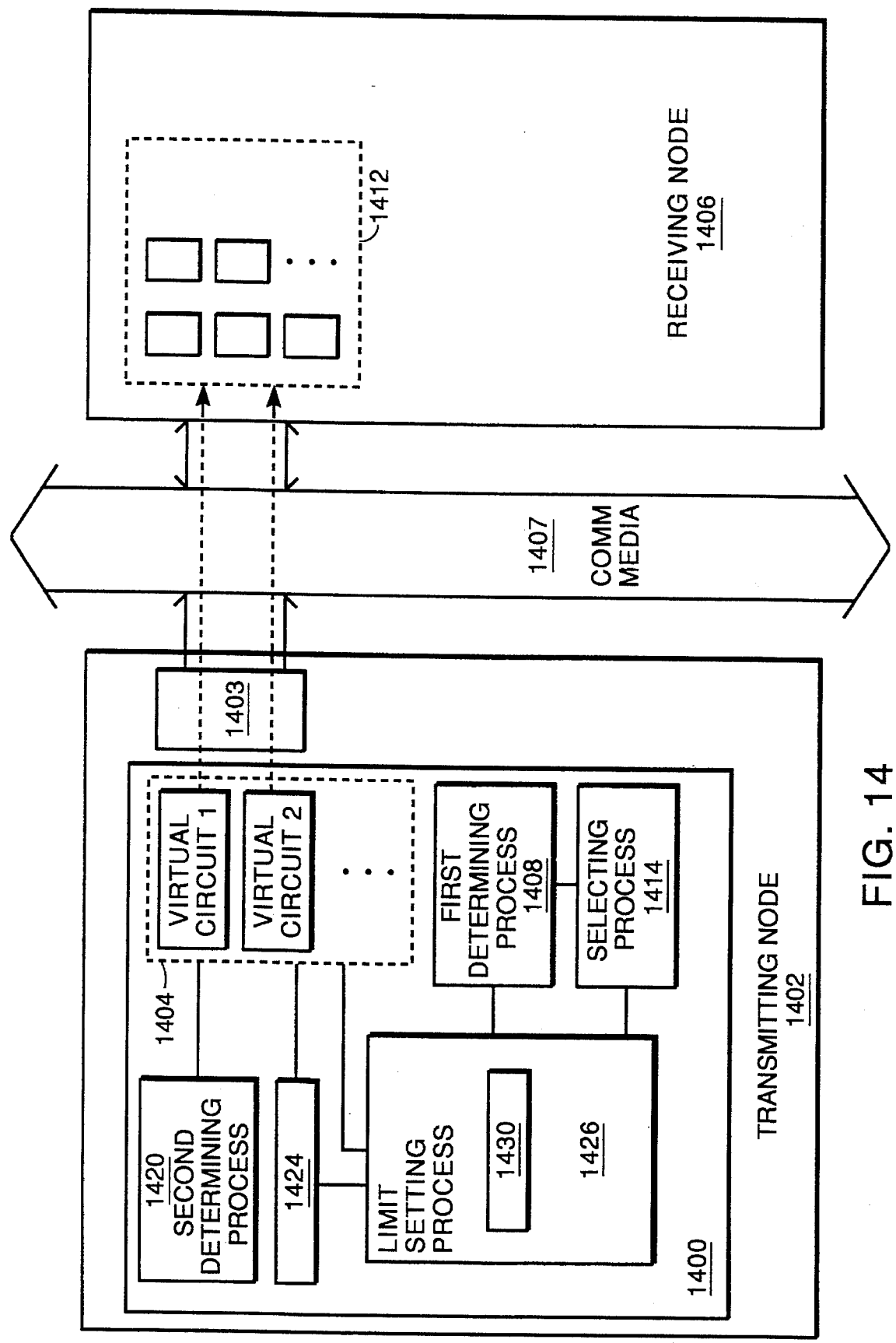
FIG. 14 is a drawing of an example embodiment of a flow control system using smooth global limit setting, for a transmitting node.

FIG. 14 shows a flow control system 1400 for a transmitting node 1402 having a plurality of virtual circuits 1404 with a receiving node 1406. The transmitting node 1402 includes a transceiver circuit 1403 coupled with the flow control system 1400, and further coupled with a communications media 1407. The receiving node 1406 is also coupled to the communications media 1407.

The flow control system 1400 is shown having a first determining process 1408, for determining the number of receive buffers 1412 in the receiving node 1406, the number of receive buffers 1412 referred to hereinafter as $b_{max}$. The flow control system 1400 is further shown having a selecting process 1414, coupled with the first determining process 1408, for selecting a cutoff value, hereinafter referred to as $b_{cutoff}$, the cutoff value $b_{cutoff}$ selected to be less than $b_{max}$. In an example embodiment $b_{cutoff}$ is selected to be equal to ½ $b_{max}$.

The flow control system 1400 is further shown including a second determining process 1420, coupled with the plurality of virtual circuits 1404, for determining the number of data transmission units, hereinafter referred to as r, which may be transmitted by the transmitting node 1402 during a round trip delay time between the transmitting node 1402 and the receiving node 1406. The flow control system 1400 also contains a global counter 1424, coupled with the plurality of virtual circuits 1404.

During operation of the elements shown in FIG. 14, the global counter 1424 is incremented by the number of DTUs in each message transmitted by the transmitting node 1402 to the receiving node 1406 over any of the plurality of virtual circuits 1404. The global counter 1424 is decremented in response to the transmitting node 1402 receiving buffer released messages from the receiving node 1406. In this way, the value b of the global counter 1424 is equal to the number of outstanding DTUs transmitted from the transmitting node 1402 to the receiving node 1406. An outstanding DTU is a data transmission unit transmitted from the transmitting node 1402, and not yet copied out of one of the receive buffers 1412 in the receiving node 1406. The value of the global counter 1424 hereinafter referred to as b.

Further during operation of the elements shown in FIG. 14, subsequent to receipt of a data transmission unit by the receiving node 1406 into one of the receive buffers 1412, the data transmission unit is copied out of the one of the receive buffers 1412 in the receiving node 1406. After the data transmission unit is copied out of the one of the receive buffers 1412 in the receiving node 1406, the receiving node 1406 notifies the transmitting node 1402 that the receive buffer is available to receive another data transmission unit by transmitting a buffer released message to the transmitting node 1402. The number of outstanding DTUs transmitted by the transmitting node 1402 is therefore equal to the number of DTUs transmitted by the transmitting node 1402 to the receiving node 1406, and not yet copied out of the receive buffers 1412 in the receiving node 1406.

Further with regard to the elements shown in FIG. 14, the flow control system 1400 is shown having a limit setting process 1426 for limiting the number of data transmission units transmitted by the transmitting node 1402 to the receiving node 1406 on any one of the plurality of virtual circuits 1404.

The limit setting process 1426 in FIG. 14 is coupled with the plurality of virtual circuits 1404, the first determining process 1408, the selecting process 1414, the global counter 1424, and the second determining process 1420. The limit setting process 1426 further includes a global limit register 1430. During operation of the elements shown in FIG. 14, the number of outstanding DTUs transmitted by the transmitting node 1402 to the receiving node 1406 on any one of the plurality of virtual circuits 1404 is limited to not exceed the value of the global limit register 1430. The value lim of the global limit register 1430 in FIG. 14 is referred to hereinafter as lim.

During operation of the elements shown in FIG. 14, the value lim of the global limit register 1430 is set by the limit setting process 1426. In the event that the value b of the global counter 1424 is less than or equal to the value $b_{cutoff}$, the limit setting process 1426 sets the value lim of the global limit register 1430 to the value r. In the event that the value b of the global counter 1424 is greater than or equal to the value $b_{max}$, the limit setting process 1426 sets the value lim of the global limit register 1430 to the value 1. In the event that the value b of the global counter 1424 is less than $b_{max}$, and greater than $b_{cutoff}$, the limit setting process 1426 sets the value lim of the global limit register 1430 to a value equal to a function of the global counter value b, such that the global limit register 1430 is set to values gradually decreasing from r to 1, as the value b of the global counter 1424 increases from $b_{cutoff}$ to $b_{max}$. This decreasing function of the value b of the global counter 1424 is referred to herein as an interpolation between the values r and 1.

Figure 15:
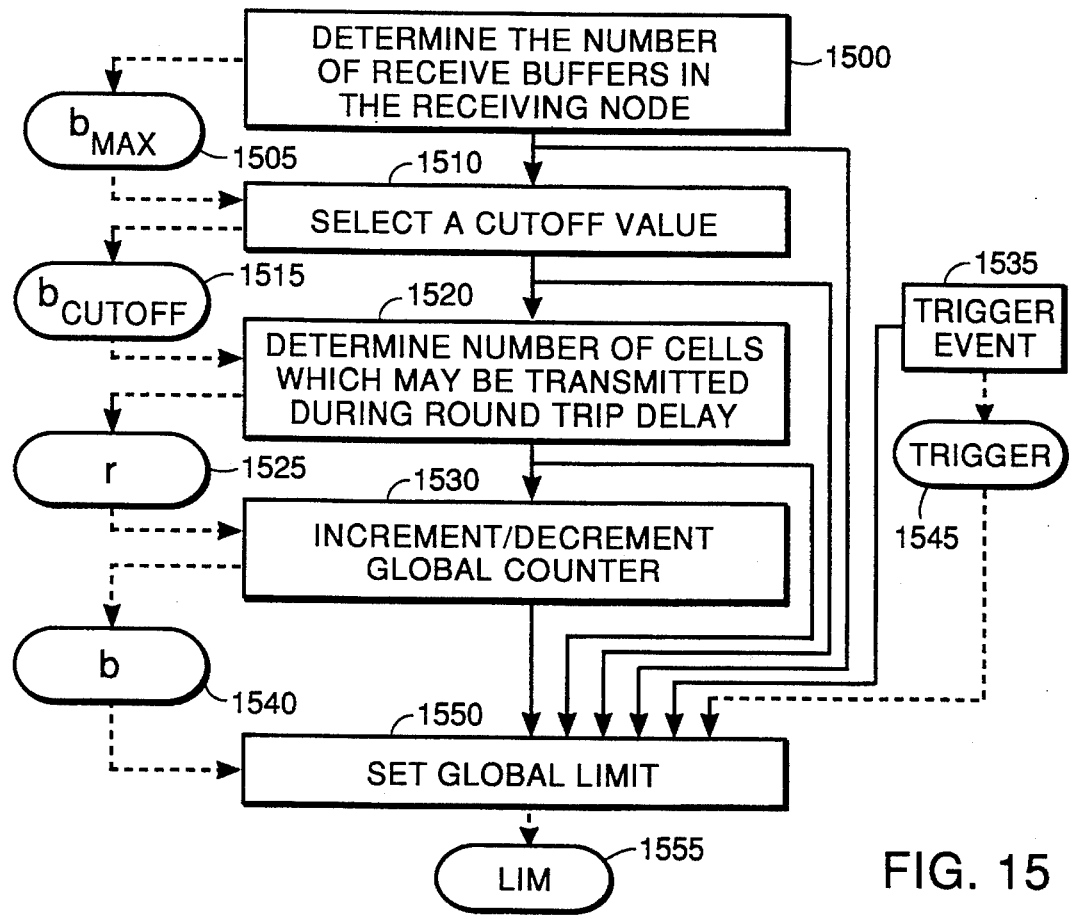
FIG. 15 is a flow chart showing the steps performed during operation of the example embodiment of the flow control system in the transmitting node shown in FIG. 14.

FIG. 15 is a flow chart showing the steps performed during operation of an example embodiment of the flow control system in the transmitting node shown in FIG. 14. In step 1500, the flow control system determines the total number of receive buffers in the receiving node available to receive data transmission units transmitted from the transmitting node. This step is performed by the first determining process 1408 shown in FIG. 14. The output 1505 of step 1500 is shown as $b_{max}$, equal to the total number of receive buffers in the receiving node available to receive data transmission units transmitted from the transmitting node.

Following step 1500, in step 1510 the flow control system selects a cutoff value less than the value $b_{max}$. This step is performed by the selecting process 1414 shown in FIG. 14. The output 1515 of step 1510 is shown as $b_{cutoff}$. In an example embodiment, the value $b_{cutoff}$ is selected to be equal to $\frac{1}{2} b_{max}$.

After step 1510, in step 1520 the flow control system determines the number of data transmission units which may be transmitted during a single round trip propagation delay period between the transmitting node and the receiving node. This step is performed by the second determining process 1420 shown in FIG. 14. The output 1525 of step 1520 is shown as r, where r is equal to step 1510, in step 1520 the flow control system determines the number of data transmission units which may be transmitted during a single round trip propagation delay period between the transmitting node and the receiving node.

Following step 1520, in step 1530 the global counter is maintained to reflect the total number of outstanding DTUs transmitted by the transmitting node. The global counter is shown as 1424 in FIG. 14. The output 1540 of step 1530 is the value b, equal to the contents of the global counter. The output 1540 is an input into step 1550.

Step 1535 is the occurrence of a triggering event that results in the recalculation of the global limit. In a first example embodiment, the trigger event is the receipt of a buffer released message by the transmitting node from the receiving node. In a second example embodiment, the triggering event is the transmission of a message by the transmitting node. The output 1545 is a trigger, causing step 1550 to be performed.

Step 1550 sets the global limit. The inputs to step 1550 are trigger, b, r, $b_{cutoff}$ and $b_{max}$. During operation of the elements shown in FIG. 14, the step 1550 is performed by the limit setting process 1426. The output 1555 of step 1550 is the value lim of the global limit register 1430 as set by the limit setting process 1426. The values for lim may either be precalculated and stored in a table, and then subsequently read from the table by the limit setting process 1426 on the occurrence of the trigger condition, or may be calculated independently on each occurrence of the trigger condition, depending on the specific implementation.

While the invention has been described with reference to a specific embodiment, the description is not meant to be construed in a limiting sense. Various modifications of the disclosed embodiment, as well as other embodiments of the invention, will be apparent to person skilled in the art upon reference to this description. It is therefore contemplated that the appended claims will cover any such modifications or embodiments which fall within the true scope of the invention.

We claim:

1. A flow control apparatus for a transmitting node having a plurality of virtual circuits with a receiving node, comprising:

first determining means to determine the number of buffers in said receiving node, said number referred to hereinafter as $b_{max}$;

selecting means to select a cutoff value, said cutoff value hereinafter referred to as $b_{cutoff}$, said cutoff value $b_{cutoff}$ selected to be less than $b_{max}$;

second determining means to determine the number of data transmission units which may be transmitted by said transmitting node during one round trip propagation delay time between said transmitting node and said receiving node, said number of data transmission units hereinafter referred to as r;

a global counter incremented in response to each data transmission unit transmitted by said transmitting node to said receiving node, and decremented in response to buffer released messages received from said receiving node, the value of said global counter hereinafter referred to as b; and means for limiting the number of data transmission units transmitted by said transmitting node to said receiving node on any one of said plurality of virtual circuits to a value of lim, responsive to said global counter having a value b greater than said $b_{cutoff}$ value, said value of lim being interpolated between said value r and a value min, where said value min is equal to a number of receive buffers reserved in said receiving node for each one of said plurality of virtual circuits.

2. The apparatus as in claim 1, wherein said means for limiting, responsive to said value b of the global counter being less than said $b_{max}$ and greater than said $b_{cutoff}$, sets said value lim to a value equal to a function of said global counter value b, such that said value lim is set to values gradually decreasing from said value r to said value min, as said value b of said global counter increases from said value $b_{cutoff}$ to said value $b_{max}$.

3. The apparatus as in claim 2, where said means for limiting stores said value lim in a global limit register.

4. An apparatus in a first network node for setting a global limit, said global limit equal to the maximum number of receive buffers in a second node available to store data transmission units transmitted from said first network node to said second network node over a given virtual circuit between said first network node and said second network node, comprising:

a global counter, containing the total number of outstanding data transmission units transmitted by said first network node to said second network node over all virtual circuits between said first network node and said second network node;

global limit setting means, for setting the value of said global limit register based on the following equation:

$$\text{global limit} = \frac{1-r}{b_{max} - b_{cutoff}} b + 1 - \frac{(1-r) b_{max}}{b_{max} - b_{cutoff}}$$

where $b_{max}$ is a predetermined maximum value equal to a total number of receive buffers in said second network node that may be used to store data transmission units transmitted from said first network node over all virtual circuits between said first network node and said second network node;

$b_{cutoff}$ is a predetermined value less than $b_{max}$, b is the value of the global counter, and r is the number of data transmission units that can be transmitted during one round trip delay between the first network node and the second network node.

5. The apparatus as in claim 4, wherein said global limit is stored in a global limit register.

6. A flow control apparatus for a network node, comprising:

an outstanding data transmission unit counter, containing the number of outstanding data transmission units transmitted by said network node over one of a set of one or more virtual circuits with a second network node;

a global counter, containing the total number of outstanding data transmission units transmitted by said network node to said second network node over said set of one or more virtual circuits;

a global limit register, containing a global limit; and flow control means, coupled with said outstanding data transmission unit counter, said global counter, and said global limit register, having first comparison means for comparing the value of said outstanding data transmission unit counter with the value of said global limit register, means, responsive to said first comparison means, for stopping transmission on said one of said set of one or more virtual circuits when the value of said outstanding data transmission unit counter has a value greater than or equal to the value of said global limit register, global limit recalculating means, having second comparison means for comparing the contents of said global counter with a first value $b_{cutoff}$, third comparison means, responsive to said second comparison means, for comparing said global counter with a second value $b_{max}$ if the contents of said global limit register are greater than or equal to said first value, and global limit setting means, responsive to said third comparison means, for setting the value of said global limit register based on the following equation:

$$\text{global limit} = \frac{1-r}{b_{max} - b_{cutoff}} b + 1 - \frac{(1-r) b_{max}}{b_{max} - b_{cutoff}}$$

where b is the value of the global counter, and r is the number of cells that can be transmitted during one round trip delay between the first network node and the second network node.

7. The apparatus as in claim 6, said global limit recalculating means responsive to transmission of a data message over one of said one or more virtual circuits with said second network node.

8. The apparatus as in claim 6, said global limit recalculating means responsive to said network node receiving a buffer released message from said second network node.

9. The apparatus as in claim 6, wherein said second value $b_{max}$ is equal to r * x, where x is the number of virtual circuits that can be established between the first network node and the second network node before throughput is limited by a lack of receive buffers, and r is the number of data transmission units that can be transmitted during one round trip delay between the first network node and the second network node.

10. The apparatus as in claim 6, said global limit recalculating means further comprising:

second global limit setting means, responsive to said first comparison means, for setting said global limit register to r when said global counter is not greater than or equal to said first value $b_{cutoff}$, and r is the number of data transmission units that can be transmitted during one round trip delay between the first network node and the second network node.

11. The apparatus as in claim 6, said global limit recalculating means further comprising:

third global limit setting means, responsive to said second comparison means, for setting said global limit register to 1 when said global counter is not less than or equal to said second value $b_{max}$.

12. The apparatus as in claim 6, said flow control means further comprising means for starting transmission on said one of said set of one or more virtual circuits when said outstanding data transmission unit counter has a value less than the value of said global limit register.

13. The apparatus as in claim 6, said flow control means further comprising means, responsive to transmission of a data message from said network node over said one of said set of one or more virtual circuits, for incrementing said outstanding data transmission unit counter.

14. The apparatus as in claim 6, said flow control means further comprising means, responsive to receipt of a buffer released message from said second network node, for decrementing said outstanding data transmission unit counter.

15. The apparatus as in claim 6, said flow control means further comprising means, responsive to said transmission of a data message over one of said set of one or more virtual circuits, for incrementing said global counter.

16. The apparatus as in claim 6, said flow control means further comprising means, responsive to receipt of a buffer released message from said second network node, for decrementing said global counter.

17. A flow control method for a transmitting node having a plurality of virtual circuits with a receiving node, comprising the steps of:

determining the number of buffers in said receiving node, said number referred to hereinafter as $b_{max}$;

selecting a cutoff value, said cutoff value hereinafter referred to as $b_{cutoff}$, said cutoff value $b_{cutoff}$ selected to be less than $b_{max}$;

determining the number of data transmission units which may be transmitted by said transmitting node during one round trip propagation delay time between said transmitting node and said receiving node, said number of data transmission units hereinafter referred to as r;

incrementing a global counter in response to each data transmission unit transmitted by said transmitting node to said receiving node;

decrementing said global counter in response to buffer released messages received from said receiving node, the value of said global counter hereinafter referred to as b; and limiting the number of data transmission units transmitted by said transmitting node to said receiving node on any one of said plurality of virtual circuits to a value of lim, responsive to said global counter having a value b greater than said $b_{cutoff}$ value, said value of lim being interpolated between said value r and a value min, where said value min is equal to a number of receive buffers reserved in said receiving node for each one of said plurality of virtual circuits.

18. The method as in claim 17, wherein said step of limiting, responsive to said value b of the global counter being less than said $b_{max}$ and greater than said $b_{cutoff}$, sets said value lim to a value equal to a function of said global counter value b, such that said value lim is set to values gradually decreasing from said value r to said value min, as said value b of said global counter increases from said value $b_{cutoff}$ to said value $b_{max}$.

19. The method as in claim 17, wherein said step of limiting stores said value lim in a global limit register.

20. A method for setting a global limit, said global limit equal to the maximum number of receive buffers in a second node available to store data transmission units transmitted from a first network node to said second network node over a given virtual circuit between said first network node and said second network node, comprising the steps of:

counting, in a global counter, the total number of outstanding data transmission units transmitted by said first network node to said second network node over all virtual circuits between said first network node and said second network node;

setting a global limit register to a value equal to the following equation:

$$\text{global limit} = \frac{1-r}{b_{max} - b_{cutoff}} b + 1 - \frac{(1-r) b_{max}}{b_{max} - b_{cutoff}}$$

where $b_{max}$ is a predetermined maximum value equal to a total number of receive buffers in said second network node that may be used to store data transmission units transmitted from said first network node over all virtual circuits between said first network node and said second network node, $b_{cutoff}$ is a predetermined value less than $b_{max}$, b is the value of the global counter, and r is the number of data transmission units that can be transmitted during one round trip delay between the first network node and the second network node.

21. The method of claim 20, wherein said global limit is stored in a global limit register.

22. A flow control method for a network node, comprising the steps of:

counting, in an outstanding data transmission unit counter, the number of outstanding data transmission units transmitted by said network node over one of a set of one or more virtual circuits with a second network node;

counting, in a global counter, the total number of outstanding data transmission units transmitted by said network node to said second network node over said set of one or more virtual circuits;

comparing the value of said outstanding data transmission unit counter with the value of a global limit register, stopping transmission on said one of said set of one or more virtual circuits, responsive to said step of comparing the value of said outstanding data transmission unit counter, when said outstanding data transmission unit counter has a value greater than or equal to the value of said global limit register, comparing the contents said global counter with a first value $b_{cutoff}$, comparing the contents of said global counter with a second value $b_{max}$, responsive to said second comparison means, if the contents of said global limit register are greater than or equal to said first value, and setting the value of said global limit register to the following equation:

$$\text{global limit} = \frac{1-r}{b_{max} - b_{cutoff}} b + 1 - \frac{(1-r) b_{max}}{b_{max} - b_{cutoff}}$$

where $b_{max}$ is a predetermined maximum value equal to a total number of receive buffers in said second network node that may be used to store data transmission units transmitted from said first network node over all virtual circuits between said first network node and said second network node, $b_{cutoff}$ is a predetermined value less than $b_{max}$, b is the value of the global counter, and r is the number of data transmission units that can be transmitted during one round trip delay between the first network node and the second network node.

23. The method as in claim 22, said step of setting the value of said global limit register responsive to transmission of a data message over one of said one or more virtual circuits with said second network node.

24. The method as in claim 22, said step of setting the value of said global limit register responsive to said network node receiving a buffer released message from said second network node.

25. The method as in claim 22, wherein said second value $b_{max}$ is equal to r * x, where x is the number of virtual circuits that can be established between the first network node and the second network node before throughput is limited by a lack of receive buffers, and r is the number of data transmission units that can be transmitted during one round trip delay between the first network node and the second network node.

26. The method as in claim 22, said step of setting the value of said global limit further comprising the step of:

setting said global limit register to r when said global counter is not greater than or equal to said first value $b_{cutoff}$, and r is the number of data transmission units that can be transmitted during one round trip delay between the first network node and the second network node.

27. The method as in claim 22, said step of setting the value of said global limit further comprising the step of:

setting said global limit register to 1 when said global counter is not less than or equal to said second value $b_{max}$.

28. The method as in claim 22, said flow control means further comprising the step of starting transmission on said one of said set of one or more virtual circuits when said outstanding data transmission unit counter has a value less than the value of said global limit register.

29. The method as in claim 22, further comprising the step of incrementing said outstanding data transmission unit counter responsive to transmission of a data message from said network node over said one of said set of one or more virtual circuits.

30. The method as in claim 22, further comprising the step of decrementing said outstanding data transmission unit counter responsive to receipt of a buffer released message from said second network node.

31. The method as in claim 22, further comprising the step of incrementing said global counter responsive to said transmission of a data message over one of said set of one or more virtual circuits.

32. The apparatus as in claim 22, further comprising the step of decrementing said global counter, responsive to receipt of a buffer released message from said second network node.

* * * * *